(12) United States Patent
Durel

(10) Patent No.: US 6,362,253 B1
(45) Date of Patent: *Mar. 26, 2002

(54) RUBBER COMPOSITION FOR TIRE CASINGS BASED ON SILICAS CONTAINING A REINFORCING ADDITIVE BASED ON A FUNCTIONALIZED POLYORGANOSILOXANE AND ON AN ORGANOSILANE COMPOUND

(75) Inventor: Olivier Durel, Blanzat (FR)

(73) Assignee: Compagnie Generale des Establissements Michelin-Michelin & Cie, Clermont-Ferrand Cedex (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/699,613

(22) Filed: Oct. 30, 2000

Related U.S. Application Data

(63) Continuation of application No. 08/782,500, filed on Jan. 10, 1997, now Pat. No. 6,140,393.

(30) Foreign Application Priority Data

Jan. 11, 1996 (FR) .............................. 96/00441

(51) Int. Cl.⁷ ................................ C08K 9/06
(52) U.S. Cl. ...................................... 523/213
(58) Field of Search ......................... 523/213

(56) References Cited

U.S. PATENT DOCUMENTS

| | | |
|---|---|---|
| 4,201,698 A | 5/1980 | Itoh et al. |
| 4,681,961 A | 7/1987 | Zerpner et al. |
| 4,714,733 A | 12/1987 | Itoh et al. |
| 4,837,274 A | 6/1989 | Kawakubo et al. |
| 4,978,704 A | 12/1990 | Perrin |
| 5,246,995 A | 9/1993 | Murakami et al. |
| 5,278,204 A | 1/1994 | Tojo et al. |
| 5,425,947 A | 6/1995 | Hautekeer et al. |
| 5,525,660 A | 6/1996 | Shiono et al. |
| 6,140,393 A | * 10/2000 | Bomal .................. 523/213 |

FOREIGN PATENT DOCUMENTS

| | | |
|---|---|---|
| DE | 2933247 | 3/1980 |
| FR | 2094859 | 1/1972 |

OTHER PUBLICATIONS

INPI Search Report.*
International Standard ISO 4223/I, 2nd Ed. (1978).*
09/699615 Bomal et al.

* cited by examiner

Primary Examiner—Paul R. Michl
(74) Attorney, Agent, or Firm—Baker Botts L.L.P.

(57) ABSTRACT

Rubber composition intended for the manufacture of tire casings which have improved hysteretic properties and scorch safety, based on at least one elastomer and silica by way of reinforcing filler enclosing a reinforcing additive consisting of the mixture and/or the product of in situ reaction of at least one functionalized polyorganosiloxane compound containing, per molecule, at least one functional siloxy unit capable of bonding chemically and/or physically to the surface hydroxyl sites of the silica particles and at least one functionalized organosilane compound containing, per molecule, at least one functional group capable of bonding chemically and/or physically to the polyorganosiloxane and/or the hydroxyl sites of the silica particles and at least one other functional group capable of bonding chemically and/or physically to the polymer chains.

26 Claims, 4 Drawing Sheets

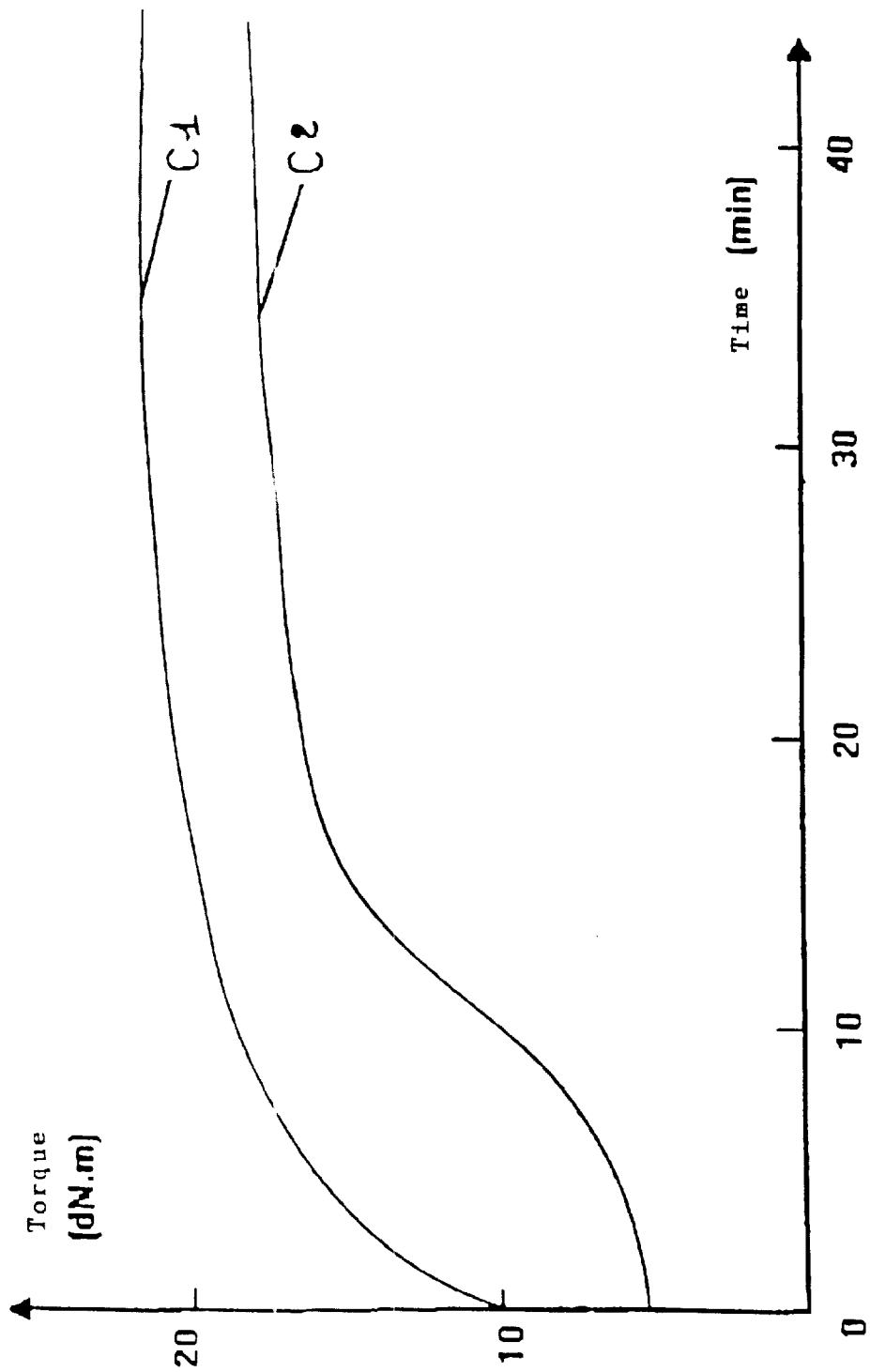
FIGURE Nº1

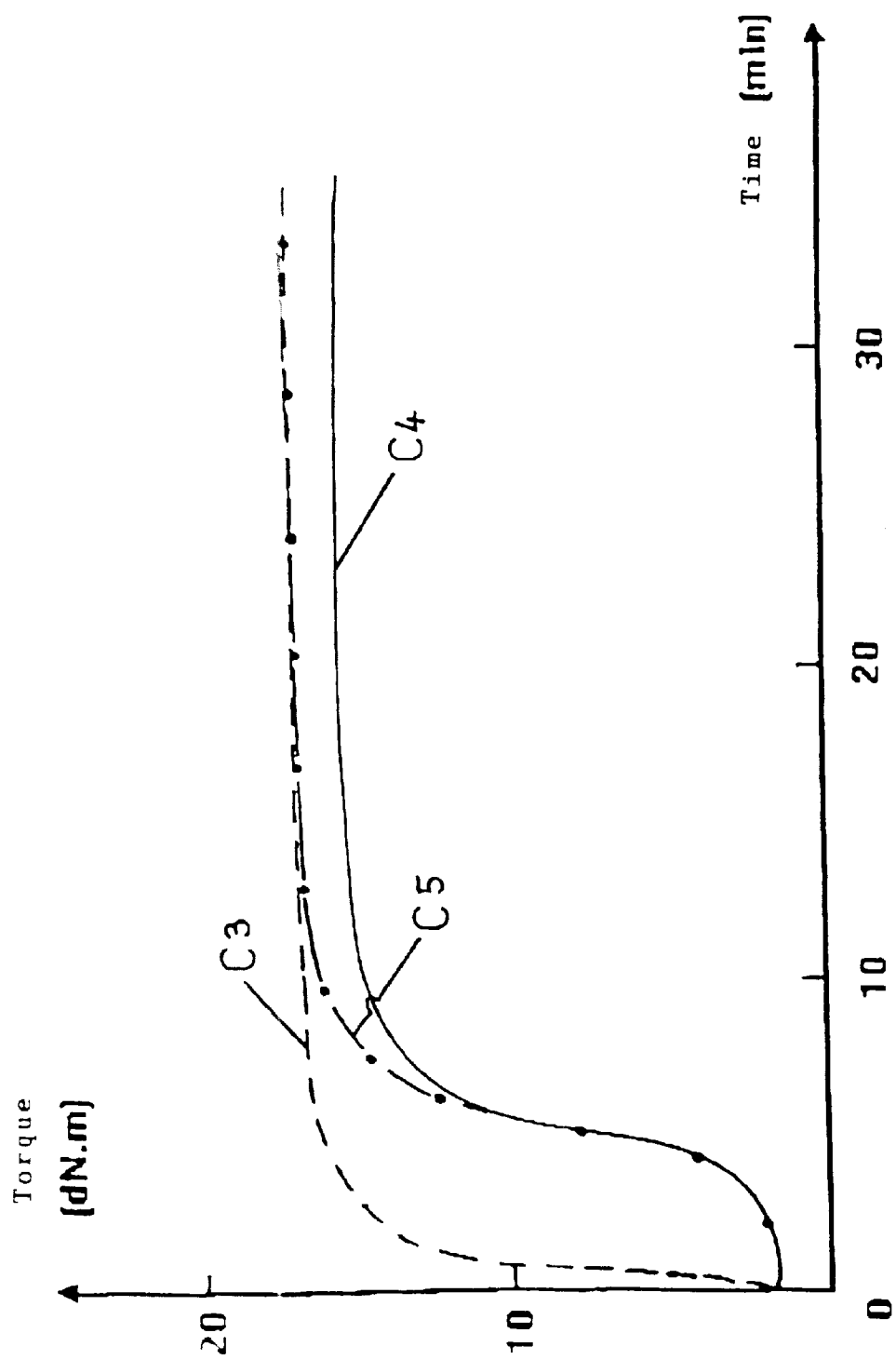
FIGURE N°2

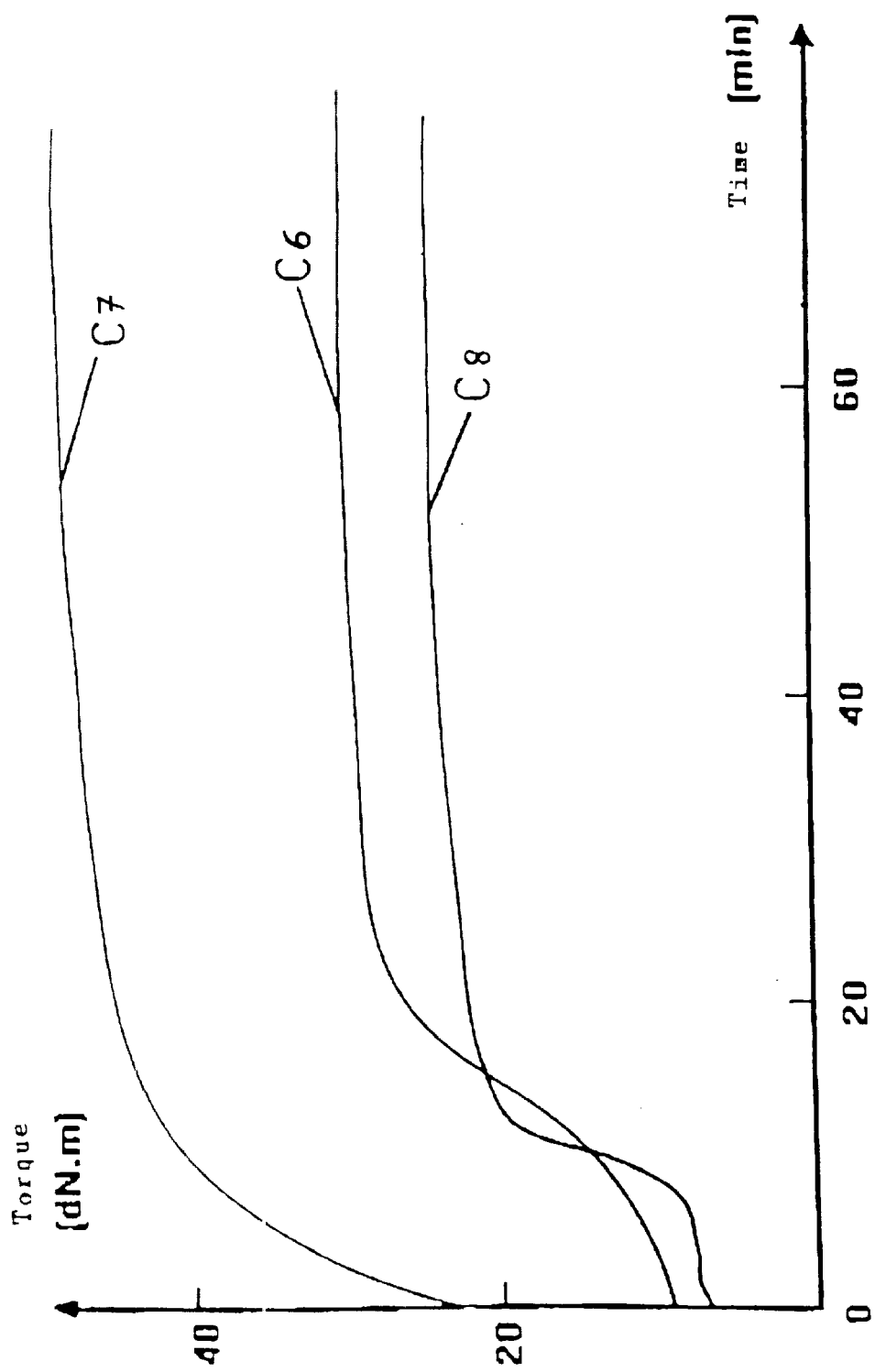
FIGURE N°3

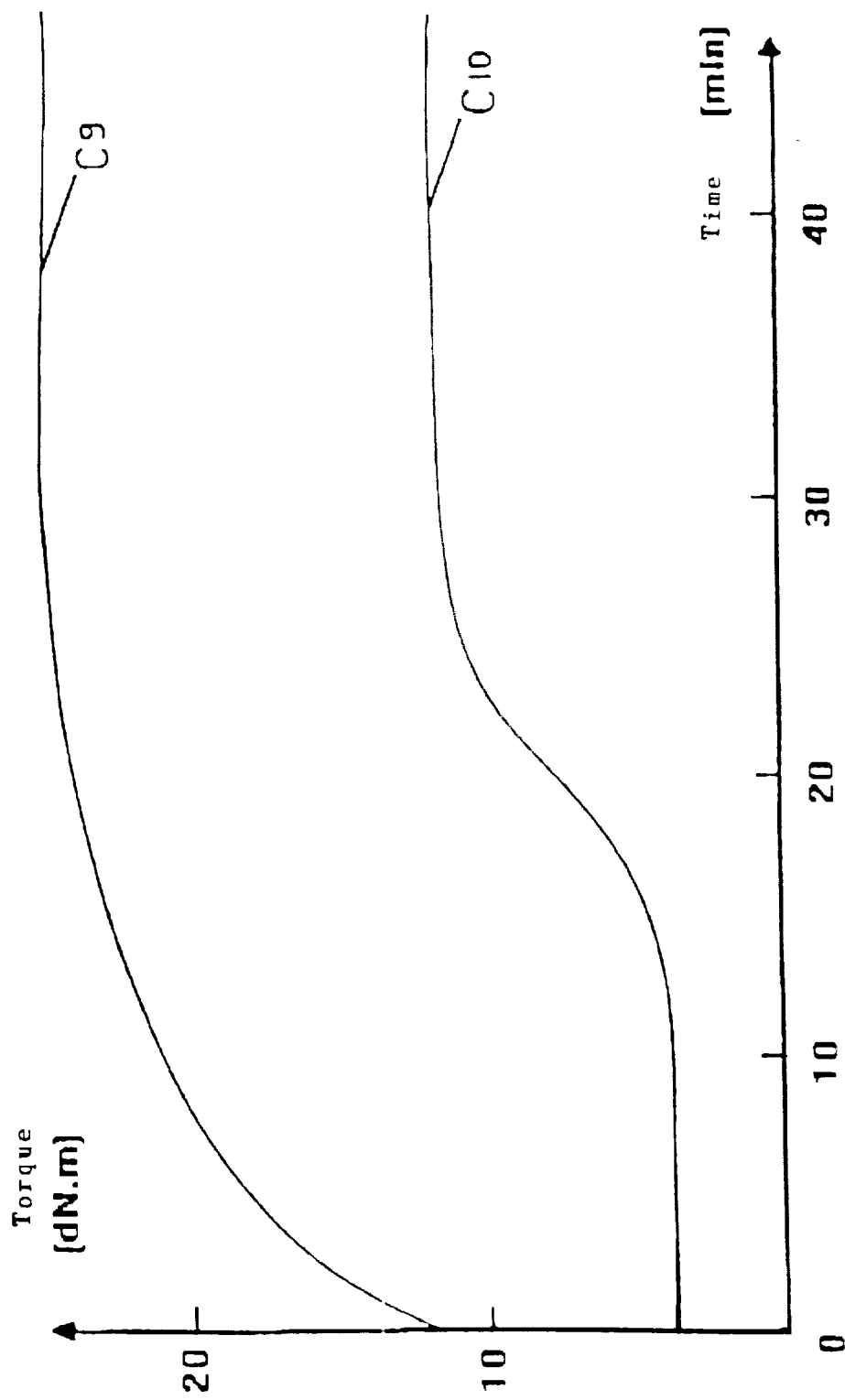
FIGURE N°4

RUBBER COMPOSITION FOR TIRE CASINGS BASED ON SILICAS CONTAINING A REINFORCING ADDITIVE BASED ON A FUNCTIONALIZED POLYORGANOSILOXANE AND ON AN ORGANOSILANE COMPOUND

This is a continuation of application Ser. No. 08/782,500 filed Jan. 10, 1997, now U.S. Pat. No. 6,140,393, which is incorporated by reference herein in its entirety.

BACKGROUND OF THE INVENTION

The present invention relates to new rubber compositions intended for the manufacture of tire casings based on precipitated silicas containing a reinforcing additive based on a functionalized polyorganosiloxane and an organosilane compound.

Since the economies of fuel and the need to protect the environment have become a priority, it is desirable to produce polymers which have good mechanical properties and a hysteresis which is as low as possible in order to enable them to be used in the form of rubbery compositions which can be employed for the manufacture of various semifinished products forming part of the constitution of tire casings, such as, for example, underlinings, calendering or sidewall rubbers or treads and to obtain tires with improved properties, which have in particular a reduced rolling resistance.

Many solutions have been proposed to meet such an objective, consisting especially in modifying, among others, the nature of the diene polymers and copolymers at the end of polymerization by means of coupling or starring or functionalizing agents. All these solutions have concentrated essentially on the use of the modified polymers with carbon black as reinforcing filler with the aim of obtaining a good interaction between the modified polymer and the carbon black. It is known, in general, that in order to obtain optimum reinforcing properties which are imparted by a filler it is appropriate that the latter should be present in the elastomer matrix in a final form which is both as finely divided as possible and distributed as homogeneously as possible. However, such conditions can be achieved only insofar as, on the one hand, the filler has a very good capacity for being incorporated into the matrix during the mixing with the elastomer and for being deaggregated or deagglomerated and for being dispersed homogeneously in the elastomer. The use of white reinforcing fillers, and especially of silica, has been found inappropriate because of the low level of some properties of such compositions and consequently of some properties of the tires utilizing these compositions.

In addition, for reasons of mutual affinities, silica particles have an unfortunate tendency, in the elastomer matrix, to agglomerate together. These silica/silica interactions have the detrimental consequence of limiting the reinforcing properties to a level which is appreciably lower than that which it would be theoretically possible to attain if all the silica/elastomer interactions capable of being created during the mixing operation were actually obtained.

What is more, the use of silica gives rise to difficulties in processing which are due to the silica/silica interactions which tend, in the raw state (before curing), to increase the consistency of the rubbery compositions and, in any event, to make the processing more difficult than the processing of carbon black.

Finally, the interactions between the silica and the crosslinking system, when the latter is sulfur-based, and the accelerators usually employed in the case of sulfur reduce the rate and efficiency of crosslinking.

In the case of silica-reinforced compositions interest has been revived with the publication of European Patent Application EP-A-0 501 227, which discloses a sulfur-vulcanizable rubber composition obtained by thermomechanical working of a copolymer of conjugated diene and of an aromatic vinyl compound, prepared by polymerization in solution with 30 to 150 parts by weight, per 100 parts by weight of elastomer, of a particular precipitated silica. The use of such a silica has undoubtedly reduced the difficulties in processing the mixtures containing it, predominantly or otherwise, as reinforcing filler, but the processing of such rubbery compositions nevertheless remains more difficult than the processing of carbon black.

It is known to a person skilled in the art that a coupling or bonding agent which reacts with silica must be employed to create good interactions between the surface of the silica and the elastomer while promoting the dispersion of the silica, and the compositions described in European Patent Application EP-A-0 501 227 are also subject to this need.

One objective of a person skilled in the art consists in improving the processing of the diene rubber compositions including silica as reinforcing filler which are intended for the manufacture of tire casings and, on the other hand, to reduce the quantity of coupling and/or reinforcing agent needed, without degrading the properties of such compositions.

Thus, in U.S. Pat. No. 3,350,345 it has been proposed to employ, in rubber compositions including silica, a hydrolyzable silane and in particular a mercaptosilane as elastomer/silica coupling agent. In Patent Application FR-A-2,094,859 it was subsequently proposed to employ rubber compositions including silica and a mercaptosilane as coupling agent for the manufacture of tire treads, because of the improved properties exhibited by such compositions. It was rapidly demonstrated and known to a person skilled in the art that mercaptosilanes and in particular γ-mercaptopropyltrimethoxysilane and γ-mercaptopropyltriethoxysilane were capable of providing the best silica/elastomer coupling properties, but that the industrial use of these coupling agents was not possible because of the high reactivity of the SH functional groups resulting very rapidly, during the preparation of a composition in an internal mixer, in premature vulcanizations, also called "scorching", with very high Mooney plasticities and, all things considered, in compositions which were virtually impossible to work and to process on industrial scale.

To illustrate this impossibility of employing such coupling agents and the compositions containing them on industrial scale, Patent Application FR-A-2,206,330 and U.S. Pat. No. 4,002,594 may be mentioned.

To overcome this disadvantage, in Patent Application FR-A-2,206,330 it has been proposed to employ as coupling agent organosilane polysulfides, including bis-3-triethoxysilylpropyl tetrasulfide, which are found to give the best compromise, in the case of silica-filled vulcanizates, in terms of scorch safety, ease of processing and reinforcing power. However, this coupling agent is very costly and must be employed in a relatively large quantity, of the order of 2 to 3 times greater than the quantity of γ-mercaptopropyltrimethoxysilane needed to obtain equivalent coupling property levels.

Consequently, it therefore appears desirable from an economical viewpoint to have the ability to develop on industrial scale silica-reinforced rubber compositions including low contents of reinforcing additives which are as effective as mercaptosilanes, but while avoiding premature is scorching and problems in processing which are related to an excessive viscosity of the compositions.

An attempt in this direction was described in U.S. Pat. No. 4,474,908 which discloses the use of the mixture of a mercaptosilane and an alkoxysilane as reinforcing additive for a rubber composition.

However, this route is not a satisfactory remedy to the problem of scorching and of processing and, in addition, it is costly.

Another attempt has been described in Japanese Patent Application JP-A-06,248,116, which discloses rubber compositions intended for the manufacture of tire casings including, as reinforcing filler, a blend of carbon black and of silica surface treated with unfunctionalized silicone oils (generally and usually called PDMS by a person skilled in the art), as well as a silane as coupling agent. This route does not enable the problem faced by a person skilled in the art to be solved, whether the filler consists of a black/silica dilution or silica alone. In fact, the solution described in this application requires the pretreatment of the silica with the silicone oil at a high temperature (approximately 250° C.) and for an extended period (approximately 1 hour) before it is incorporated into the elastomer and into the coupling agent.

The present invention remedies the problem presented by the use, in rubber compositions based on at least one elastomer and intended for the manufacture of a tire casing which has improved hysteretic properties and which includes silica as reinforcing filler, of a reinforcing additive consisting of the mixture and/or the product of in situ reaction of at least one functionalized polyorganosiloxane compound containing, per molecule, at least one functional siloxy unit capable of bonding chemically and/or physically with the surface hydroxyl sites of the silica particles and at least one functionalized organosilane compound containing, per molecule, at least one functional group capable of bonding chemically and/or physically with the polyorganosiloxane and/or the hydroxyl sites of the silica particles and at least one other functional group capable of bonding chemically and/or physically to the chains of elastomer(s).

Another object of the invention is the use, for the manufacture of tire casings, of a rubber composition based on at least one elastomer, including silica as reinforcing filler and a reinforcing additive consisting of the mixture and/or the product of in situ reaction of at least one functionalized polyorganosiloxane compound containing, per molecule, at least one functional siloxy unit capable of bonding chemically and/or physically with the surface hydroxyl sites of the silica particles and at least one functionalized organosilane compound containing, per molecule, at least one functional group capable of bonding chemically and/or physically with the polyorganosiloxane and/or the hydroxyl sites of the silica particles and at least one other functional group capable of bonding chemically and/or physically to the chains of elastomer(s).

Another subject-matter of the present invention is semifinished constituents which can be employed in the manufacture of tires, especially of treads, and tires which have an improved rolling resistance, obtained by the use of a rubber composition according to the invention embodying silica as reinforcing filler.

Another subject-matter of the present invention is a process for improving the hysteretic properties of silica-reinforced rubber compositions intended for the manufacture of tire casings, and of semifinished products for tire casings.

Another subject-matter of the present invention is a tire casing including a rubber composition comprising at least one elastomer, silica as a reinforcing filler and a covering additive, wherein the covering additive consists of at least one functionalized polyorganosiloxane compound containing, per molecule, at least one functional siloxy unit capable of bonding chemically and/or physically with the surface hydroxyl sites present on the silica particles.

Finally, another subject-matter of the present invention is a process making it possible to delay substantially the scorching of diene rubber compositions intended for the manufacture of tire casings and of semifinished products for tire casings during the stages of preparation and processing of said compositions.

The reinforcing additive employed in the rubber compositions in accordance with the invention includes, on the one hand, one or a number of functionalized polyorganosiloxane compound(s) containing, per molecule, one or a number of functional siloxy unit(s) capable of bonding chemically and/or physically with the surface hydroxyl sites of the silica particles and, on the other hand, one or a number of functionalized organosilane compound(s). Particularly suitable among the functionalized polyorganosiloxanes are those in which the siloxy units contain a hydrolyzable functional substituent or one or a number of H or OH residue(s) whose reactivity towards silica differs from the other recurring functional substituent(s) of the polyorganosiloxane.

Any compound corresponding to any one of the following compounds may be chosen as suitable functionalized polyorganosiloxane compounds for the present invention:

(A)—the compounds containing, per molecule,

α—on the one hand, at least one functional siloxy unit of formula:

$$(R)_a Y\, Si(O)_{(3-a)/2} \qquad (I)$$

in which:

a=0, 1 or 2,

R is a monovalent hydrocarbon radical chosen from linear or branched alkyls containing from 1 to 6 carbon atoms, in particular methyl, ethyl, propyl and butyl and/or from aryls and in particular phenyl, methyl being more particularly preferred, the radicals R being identical or different when a=2, Y is a linear or branched alkoxy radical chosen, preferably, from $C_1$–$C_{15}$, and in particular $C_1$–$C_6$, alkoxys, methoxy, ethoxy and (iso)propoxy being more particularly adopted, β—and optionally, on the other hand, at least one functional siloxy unit of formula:

$$(R)_b W\, Si(O)_{(3-b)/2} \qquad (II)$$

in which:

b=0, 1 or 2,

R corresponds to the same definition as that given above for the substituent R of unit (I) and may be identical with or different from the latter, W is a monovalent hydrocarbon radical containing from 2 to 30 carbon atoms and optionally S and/or O atoms and constituting a functional residue bonded to silicon by an Si—C bond, this residue being chosen from the following groups:

(i) a linear or branched alkyl group containing at least 7 carbon atoms, (ii) a linear or branched $C_2$–$C_{20}$ alkenyl group containing one or more double bond(s) in and/or at the end(s) of the chain(s) said double bonds being preferably conjugated and/or associated with at least one activating group in the α position, (iii) a saturated or unsaturated aliphatic mono- or polycyclic group containing 5 to 20 carbon atoms and one or more ethylenic double bond(s) in the ring(s), optionally bonded to silicon through the intermediacy of a $C_2-C_{10}$ linear or branched alkylene radical, γ—and optionally, on the other hand, at least one siloxy unit of the following formula:

in which:

c=0, 1, 2 or 3, d=1 and c+d≦3 the substituents R being as defined above in units (I) and (II).

According to a terminology which is conventional in silicones, the units (I) and (II) may be M, D and T units; in the latter case the polyorganosiloxanes are in the form of linear chains which are mutually crosslinked.

(B)—The compounds of formula (IV):

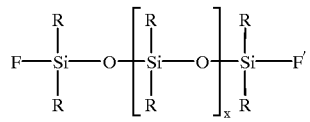

in which:

R is a hydrocarbon radical corresponding to the same definition as that of R given above as legend in formula (I), or a linear or branched $C_2-C_{20}$ alkenyl group containing one or more double bonds. The various exemplars of R may be identical with or different from each other, x=0 to 500, preferably x=0 to 50, F and F' are monovalent radicals chosen from hydrogen, the halogens and preferably chlorine, those corresponding to the definition of R, and/or hydroxyl, alkoxy, enoxy, acyloxy, more particularly acetoxy, oxime and amine functional groups; the hydroxyl, methoxy and ethoxy functional groups being more particularly preferred. F and F' may be different or identical, but in the latter case it must not be a question of the radical R, and constitute the functional substituents of the functional siloxy units.

(C)—Polyorganosiloxane resins containing monovalent radicals and/or reactive functional groups F and F', these symbols having the same definition as that given above as legend in formula (IV).

The polyorganosiloxanes (A) are notable in that the functional substituent Y is hydrolyzable and allows grafting on silica, whereas the functional substituent W which is optionally present is hydrolyzable with greater difficulty than the functional substituent Y and is capable of expressing various properties as a function of its chemical nature.

The substituent W of the unit of formula (II) is preferably chosen from the following radicals:

a radical (i) containing from 10 to 30 carbon atoms and chosen preferably from the following alkyl radicals: dodecyl, undecyl, tridecyl;

a $C_6-C_{10}$ radical (ii), containing a double bond and preferably another one, conjugated or unconjugated with the first one;

a saturated or unsaturated aliphatic monocyclic or polycyclic group (iii) containing 5 to 20 carbon atoms, more particularly cyclohexyl, cyclohexenyl or bicyclic rings originating from norbornene or from dicyclopentadiene, optionally linked to silicon through the intermediacy of a $C_2-C_6$ linear or branched alkylene radical.

It is appropriate to emphasize that when more than one exemplar of a unit of a given type (I, II or III) is present in the polyorganosiloxane, the various exemplars may be identical with or different from each other. It is even possible advantageously to use this plurality to advantage. For example, functionalized polyorganosiloxanes simultaneously carrying ethoxy and methoxy functional groups as functional groups Y will enable a person skilled in the art to modulate the rate of reaction with the silica as a function of the respective percentages of the two functional groups.

Bearing in mind the values which can be taken by the indices a to d attributed to the substituents in the units (I), (II) and (III), it must be understood that the polyorganosiloxanes may exhibit a linear and/or branched and/or cyclic structure.

The preferred radicals R are: methyl, ethyl, n-propyl, isopropyl or n-butyl. Still more preferably, at least 80% of the number of the radicals R are methyls.

The preferred alkoxy radicals Y are ethoxys.

As preferred polyorganosiloxanes with which the invention is concerned there are mentioned first of all those formed by random, sequential or block linear copolymers of the following average formula (V):

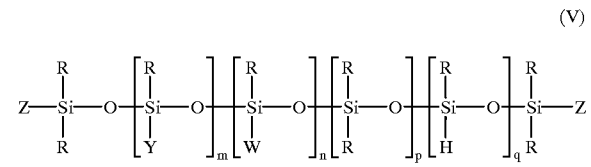

in which:

the symbols Y, W and R are as defined above, the symbol Z is a monovalent radical chosen from the radicals formed by hydrogen and from those corresponding to the definitions of R, Y and W, the sum m+n+p+q≧3, preferably between 3 and 100; the illustrated case in which p=q=0, m≧1 and n≦50 being more particularly preferred, 0≦m100, preferably 1≦m≦50

0≦n≦100, preferably 1≦n≦50

0≦p≦20, preferably 0≦p≦10

0≦q≦40, preferably 0≦q≦10, with the conditions according to which:

if m=0, at least one of the substituents Z corresponds to a radical corresponding to the definition characterizing Y if m=n=0 and p+q≧1, then at least one of the substituents Z corresponds to a radical corresponding to the definition characterizing Y.

Among the polyorganosiloxanes of formula (V) which are more particularly preferred there may be mentioned those in the case of which p=q=1 and 0.5≦m/n≦5, preferably 1≦m/n≦3.

The compounds corresponding to the following formulae may be mentioned by way of examples of linear functionalized polyorganosiloxanes:

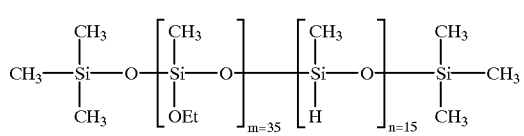

(V-1)

with, on average, m: 35 and n: 15

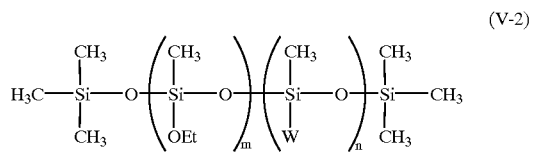

(V-2)

with, on average, m: 29 and n: 15 and W corresponding to:
—(CH$_2$)$_7$—CH$_3$

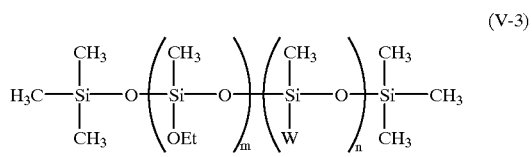

(V-3)

with, on average, m: 23 and n: 8.5 and W corresponding to:
—(CH$_2$)$_4$—CH=CH$_2$

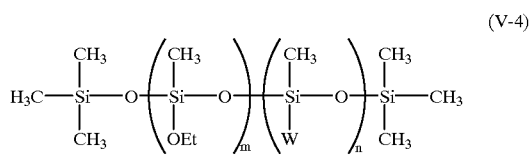

(V-4)

with, on average, m: 35 and n: 16 and W corresponding to:

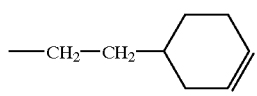

An alternative to the linear structure of the polymers of formula (V) as defined above relates to polyorganosiloxanes consisting of cyclic copolymers of the following average formula:

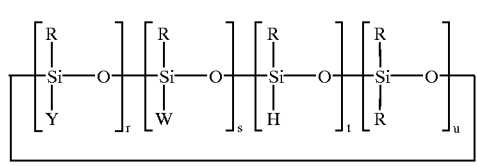

(VI)

in which:

Y, W and R are as defined above, and with r, s, t and u representing positive whole or decimal numbers, the sum r+s+t+u≧3, preferably between 4 and 8, the case illustrated in which t=u=0 being more particularly preferred, 1≦r≦8, preferably 1≦r≦4
1≦s≦8, preferably 1≦s≦4
0≦t≦8, preferably 0≦t≦4
0≦u≦8, preferably 0≦u≦4.

The polyorganosiloxanes preferably consist of products corresponding to those in the case of which R=CH$_3$ and p=u=0 and q=t=0 in the formulae (V) and (VI) defined above.

It is obvious that, as already indicated above, in these formulae (V) and (VI) the radicals W may be of identical or different nature when n>1 and s>1.

A number of polyorganosiloxanes of the type defined above may, of course, be employed within the scope of the present invention.

These polyorganosiloxanes and especially the multifunctional polyorganosiloxanes are obtained according to a process consisting, on the one hand, in reacting a starting polyorganosiloxane containing units of formula (II) as defined above, in which W denotes hydrogen, with at least one alcohol from which the functionality Y of the unit (I) is derived, and used at the same time as a reactant and as reaction solvent, in the presence of a catalyst in which at least one of the active elements is chosen from the transition metals, according to a dehydrocondensation mechanism (1st stage), and, on the other hand, in using the addition of the polyorganosiloxane converted by dehydrocondensation to at least one olefinic compound from which the functionality W of the unit (II) is derived according to a hydrosilylation mechanism (2nd stage), in the presence of a catalyst and preferably at a temperature of between 5 and 100° C. and still more preferably between 5 and 70° C.

As a matter of priority, the alcohols used are monohydroxy linear or branched alkanols (primary, secondary or tertiary, preferably primary) which are preferably chosen from the following list: methanol, ethanol, (iso)propanol and (n) butanol, ethanol being preferred.

With regard to the catalyst, this is advantageously chosen from those containing at least one of the following elements: Pt., Rh, Ru, Pd and Ni and their combinations, this catalyst being optionally coupled to a support which is inert or otherwise.

According to a preferred arrangement of the invention, the catalyst is taken from the class of the platinum catalysts which are conventionally employed for carrying out hydrosilylation reactions. These platinum catalysts are extensively described in the literature. It is possible, in particular, to mention the complexes of platinum and of an organic product which are described in U.S. Pat. No. 3,159,601, U.S. Pat. No. 3,159,602, U.S. Pat. No. 3,220,972 and European Patents EP-A-57 459, EP-188 978, EP-A-190 530 and the complexes of platinum and of vinylorganopolysiloxane described in U.S. Pat. No. 3,419,593, U.S. Pat. No. 3,715,334, U.S. Pat. No. 3,377,432 and U.S. Pat. No. 3,814,730. The Karstedt catalyst is an example of platinum catalyst which is appropriate for the process according to the invention. (Karstedt patent U.S. Pat. No. 3,775,452).

Nickel-based catalysts like, for example, Raney nickel, constitute a possible alternative to the platinum catalysts.

Where the reaction conditions are concerned, the dehydrocondensation can be carried out over a wide range of temperature extending, for example, from 0 to 200° C., but it is clear that it is preferred that it should be performed at a temperature of between 10 and 50° C., preferably between 18 and 35° C.

The second stage of the process according to the invention consists of a reaction of addition of the hydrogenated intermediate polyorganosiloxane produced by dehydrocondensation to at least one olefinic compound carrying at least one π bond.

This involves a hydrosilylation mechanism, in the presence of a catalyst and, preferably, at a temperature between 5 and 100° C. and still more preferably between 5 and 70° C.

According to a preferred methodology the hydrosilylation is initiated by adding the olefinic compound from which the radical W as defined above is derived to the intermediate alkoxylated polyorganosiloxane, once the dehydrocondensation is finished. In practice this addition can take place when the release of hydrogen has ceased.

The reactive alkene may be formed by a mixture of products comprising a single or a number of precursor species of radicals W, which determine the multifunctionality of the final polyorganosiloxane. In the case where a number of species W are provided, the alkene corresponding to the second functionality is preferably allowed to react first of all and then, once the latter has reacted completely, the alkene corresponding to the third functionality is incorporated, and so on.

Instead of being incorporated into the reaction mixture after dehydrocondensation, the olefinic compound which is a precursor of W may be used before this first stage of the process begins, or else during it.

The olefinic compounds used can be easily deduced from the definition of W given above. The choice with regard to this radical is determined by the intended applications (one or a number of different functionalities).

The hydrosilylation stage may advantageously take place at ambient temperature and in bulk or in solution, for example in the alcohol which has been used as solvent for the dehydrocondensation reaction.

When the reactions are finished, the raw polyorganosiloxanes which are obtained may be purified particularly by being passed through a column filled with an ion exchange resin and/or by simple devolatilization of the excess reactants introduced and optionally of the solvent used, by heating which is performed between 100 and 180° C. at reduced pressure.

The starting polyorganosiloxane is advantageously selected from those corresponding to the following formula:

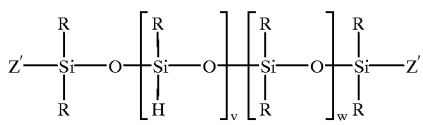
(VII)

in which:
the symbols R are identical or different and are as defined above as legend to the formula of units (I) and (II),
the symbols Z' are identical or different and correspond to R or to hydrogen,
v is an integer or a decimal number$\geq 0$ which can be defined as follows: v=n+m+p; n, m and p corresponding to the definitions given above as legend to the formula of unit (V), with the condition according to which if v=0 then w$\geq 1$ and both radicals Z' correspond to hydrogen,
w corresponds to the same definition as that of p given above as legend to the formula of unit (V).

The starting polyorganosiloxanes used, for example, for the preparation of the cyclic functionalized products are those selected from those corresponding to the following average formula:

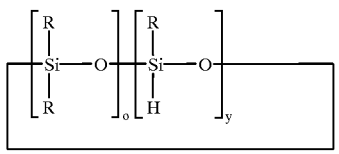
(VIII)

in which:
the symbols R are identical or different and are as defined above, as legend to the formula of units (I) and (II),
o corresponds to the same definition as that of u given above, as legend to the formula of unit (VI),
y is an integer or a decimal number$\geq 0$, which can be defined as follows: y=r+s+t and y+u$\geq 3$; r, s, t and u corresponding to the definitions given above as legend to the formula of unit (VI).

The following are preferably suitable as examples of compounds (B):

The silanol-ended polydimethylsiloxanes such as the following commercial products manufactured by Huls America Inc. which appear in the 1994 catalog of the company ABCR—Roth—Sochiel Sarl under the reference:

PS 340

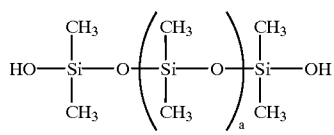

with a denoting a positive integer, to give a weight-average mass between 400 and 700.

PS 341

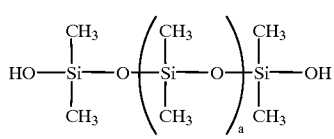

with a denoting a positive integer, to give a weight-average mass of 4200.

The polydimethylsiloxanes ending in ethoxy groups, such as the products manufactured by Huls America Inc. and which appear in the 1994 catalog of the company ABCR—Roth—Sochiel Sarl under the reference:

PS 395

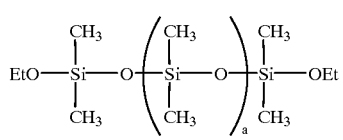

with a denoting a positive integer, to give a weight-average mass between 700 and 1200.

The compounds (C) are polyorganosiloxane resins consisting of small macromolecular networks of one or more ring(s) as a result of the presence of M, D, T or Q units in the molecule, according to a conventional silicone terminology, and containing monovalent radicals and/or reactive functional groups.

By way of example of such resins there may be mentioned the compounds corresponding to the formula:

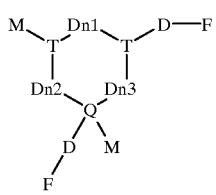

(IX)

in which:
- n denotes the number of D units in each chain link of the ring: $0 \leq n1$, n2, $n3 \leq 20$
- F and F' are monovalent radicals chosen from hydrogen, chlorine, those corresponding to the definition of R, and/or hydroxyl, alkoxy, enoxy, acyloxy, more particularly acetoxy, oxime and amine functional groups; the hydroxyl, methoxy and ethoxy functional groups being more particularly preferred; F and F' may be different or identical, but in the latter case it must not be the radical R.

It is obvious that the number of chain links of each ring may be greater than 3, just as the number of units F may be greater than 2, while being of the same kind or of different kinds.

By way of example of such resins there may be mentioned the MQ resins, the MDQ resins, the DT resins and the MDT resins, which have a hydroxyl or alkyl group weight content of between 1 and 6%.

More particularly, the resins which have a molecular mass lower than 25,000 may be employed.

By way or preferred example of compounds (C) there may be mentioned the polyorganosiloxane resin 4509 marketed by the company Rhône-Poulenc, in which the molar percentage of the various units M, D and T is:

M=15%, D=25%, T=60% and the percentage, by volume, of hydroxyl functional groups=0.5%.

Finally, it is possible within the scope of the invention to employ a mixture of at least two of the polyorganosiloxanes A, B and C.

One or more compounds corresponding to at least one of the following four general formulae (X) to (XIII) are suitable as organosilane compounds which can be employed within the scope of the invention:

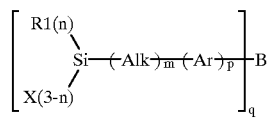

(X)

in which:
- R1 denotes an alkyl group containing 1 to 10 carbon atoms, or else the phenyl radical,
- X denotes a hydrolyzable group chosen from:
  - the halogens, preferably chlorine,
  - alkoxy or cycloalkoxy radicals,
  - acyloxy radicals,
  after hydrolysis, X may optionally denote a hydroxyl group (OH).

$0 \leq n \leq 2$

- (Alk) denotes a divalent hydrocarbon group chosen from linear or branched alkyls containing from 1 to 10 carbon atoms and advantageously from 1 to 6,
- m denotes 0 or 1,
- (Ar) denotes a hydrocarbon group chosen from aryls, containing from 6 to 12 carbon atoms and preferably 6 to 8,
- p denotes 0 or 1, with the condition that p and m are not equal to 0 simultaneously,
- q=1 or 2,
- B denotes a group capable of forming a bond with at least one of the elastomers of the rubber composition. The preferred groups B are the mercapto (SH) groups in the case of q=1 and the polysulfide (Sx) and disulfide ($S_2$) groups in the case of q=2.

However, the group B may also include other groups capable of reaction with the rubbery polymer, for example:

B denotes:

—if q=2: a polysulfured functional group chosen from the following groups:
—Sx— with $1 \leq x \leq 8$, x being a positive integer

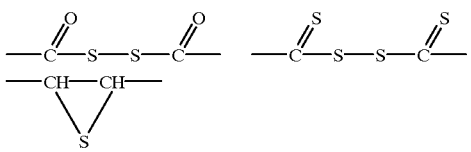

if q=1: a functional group chosen from the following groups:

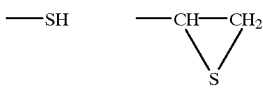

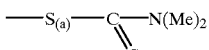 with $1 \leq n, n' \leq 6$ and n can be equal to n'

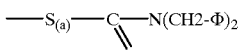 with $1 \leq a \leq 8$ with $1 \leq a \leq 8$ with $1 \leq a \leq 8$

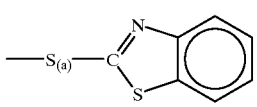

—S—Z  with Z being a halogen residue and preferably chloride or bromide or a nitrogen function, preferably amine or amide

 R: cyclic or acyclic alkyl or alkenyl, and aryl

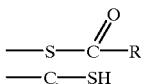

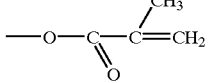

-continued

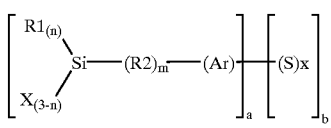
(XI)

in which:

R1 and X correspond to the same definition as that given above as legend to formula (X), $0 \leq n \leq 2$, (R2) denotes a divalent hydrocarbon group chosen from linear or branched alkyls and alkylenoxys, containing from 1 to 10 carbon atoms and advantageously from 1 to 6, m denotes 0 or 1, (Ar) denotes a hydrocarbon group chosen from aryls, containing from 6 to 12 carbon atoms, $(S)_x$ is a divalent polysulfured radical, each free valency being bonded directly to a carbon atom of an aromatic ring, it being possible for a number of aromatic rings to be linked together by the radical $(S)_x$ $2 \leq x \leq 6$, $a \geq 2$ and $b \geq 1$ with $0.4 \leq a/b \leq 2$

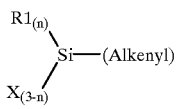
(XII)

in which:

R1 and X correspond to the same definition as that given above as legend to formula (X), $0 \leq n \leq 2$, Alkenyl denotes a linear or branched hydrocarbon is group, cyclic or otherwise, containing one or more double bonds, containing from 2 to 20 carbon atoms and preferably from 2 to 6. The double bonds are preferably conjugated and/or associated at least with an activating group situated in the a position.

This class of bonding agent corresponding to the formula (XII) is preferably employed in rubber compositions with at least one radical initiator, preferably consisting of at least one peroxide.

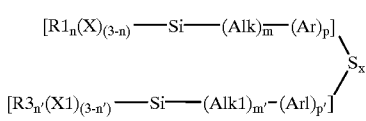
(XIII)

in which:

the symbols R1, R3, X, X1, Alk, Alk1, n, n', m, m', Ar, Ar1, p and p' are identical or different and correspond to the same definition as that given above as legend to formula (X), $1 \leq x \leq 8$, Sx therefore denotes a mono-, di- or polysulfide radical, with the condition of not simultaneously having n=n', m=m', p=p', X=X1, R1=R3, Alk=Alk1 and Ar=Ar1.

Examples of commercial organosilane compounds are given in the table below. Of course, the invention is not limited to these compounds.

| Chemical name | Formula | Trade name/supplier |
|---|---|---|
| 3-Mercaptopropyl-trimethoxysilane | $HS(CH_2)_3Si(OCH_3)_3$ | A-189/OSI |
| 3-Mercaptopropyl-triethoxysilane | $HS(CH_2)_3Si(OC_2H_5)_3$ | Dynasylan 3201/Huls |
| Vinyltriethoxysilane | $C_2H_3Si(OC_2H_5)_3$ | Dynasylan VTEO/Huls |
| 3-Aminopropyl-triethoxysilane | $NH_2(CH_2)_3Si(OC_2H_5)_3$ | A-1100/OSI |
| 3-Methacryloxy-propyltri-methoxysilane | $CH_2CCH_3COO(CH_2)_3Si(OCH_3)_3$ | A-174/OSI |
| Mercaptomethyl-dimethyl-ethoxysilane | $HSCH_2Si(CH_3)_2(OC_2H_5)$ | M8200/ABCR |
| Bis(triethoxysilyl-propyl) tetrasulfide | $[(C_2H_5O)_3Si(CH_2)_3S_2]_2$ | Si 69/Degussa |
| Bis(trimethoxysilyl propyl) tetrasulfide | $[(CH_3O)_3Si(CH_2)_3S_2]_2$ | Si 167/Degussa |
| 3-Chloropropyl-trimethoxysilane | $(CH_3O)_3Si(CH_2)_3Cl$ | Si 130/Degussa |
| 3-Thiocyanato-propyltriethoxy-silane | $(C_2H_5O)_3Si(CH_2)_3SCN$ | Si 264/Degussa |
| Bis(triethoxysilyl-ethyltolyl) trisulfide | $[C_2H_5O)_3Si(CH_2)_2-C_6H_5(CH_3)_2[(S)_3]$ | URC2/OSI |

Any precipitated or pyrogenic silicas known to a person skilled in the art, which have a BET surface $\leq 450$ m$^2$/g and a CTAB specific surface $\leq 450$ m$^2$/g are suitable as silica capable of being used in the invention, even though the highly dispersible precipitated silicas are preferred.

A highly dispersible silica is intended to mean any silica which has a capacity for deagglomeration and for dispersion in a polymeric matrix which is very great and observable by electron or optical microscopy on thin sections. The dispersibility of the silica is also assessed by means of a test for capacity for being deagglomerated by ultrasonics, followed by a measurement, by scattering on a particle size analyzer, of the size of the silica particles, in order to determine the median diameter (D50) of the particles and the deagglomeration factor (Fd) after deagglomeration as described in Patent Application EP-A-0 520 860, the content of which is incorporated here, or in the article published in the journal Rubber World, June 1994, pages 20–24, entitled "Dispersibility Measurements of Prec. Silicas".

As nonlimiting examples of such preferred highly dispersible silicas there may be mentioned those which have a CTAB surface equal to or lower than 450 m$^2$/g and particularly those described in European Patent Applications EP-A-0 157 703 and EP-A-0 520 862, the content of which is incorporated here, or the silica Perkasil KS 430 from the company Akzo, the silicas Zeosil 1165 MP and 85 MP from the company Rhone-Poulenc, the silica HI-Sil 2000 from the company PPG and the silicas Zeopol 8741 or 8745 from the company Huber.

However, by way of greater preference, the silicas which are suitable have:

a CTAB specific surface of between 120 and 200 m$^2$/g, preferably between 145 and 180 m$^2$/g, a BET specific surface of between 120 and 200 m$^2$/g, preferably between 150 and 190 m$^2$/g, a DOP oil uptake lower than 300 ml/100 g, preferably between 200 and 295 ml/100 g, a median diameter (ø50), after ultrasonic deagglomeration, equal to or lower than 3 μm, preferably lower than 2.8 μm, for example lower than 2.5 μm, an ultrasonic deagglomeration factor ($F_D$) higher than 10 ml, preferably higher than 11 ml and more preferably $\leq 21$ ml, a BET specific/CTAB specific surface ratio $\geq 1.0$ and $\leq 1.2$.

The physical state in which the silica is present, that is to say whether it is present in the form of powder, of microbeads, of granules or of beads, is immaterial.

Silica is, of course, also intended to include blends of various silicas. The silica may be employed alone or in the presence of other white fillers. The CTAB specific surface is determined according to NFT method 45007 of November 1987. The BET specific surface is determined according to the Brunauer, Emmet and Teller method described in "The Journal of the American Chemical Society", vol. 80, page 309 (1938), corresponding to NFT standard 45007 of November 1987. The DOP oil uptake is determined according to NFT standard 30-022 (March 1953), using dioctyl phthalate.

Elastomers capable of being used in the compositions in accordance with the invention are intended to mean:

1) any homopolymer obtained by polymerization of a conjugated diene monomer containing from 4 to 12 carbon atoms, 2) any copolymer obtained by copolymerization of one or more conjugated dienes with each other or with one or a number of aromatic vinyl compounds containing from 8 to carbon atoms, 3) the tertiary copolymers obtained by copolymerization of ethylene, of an a-olefin containing 3 to 6 carbon atoms with an unconjugated diene monomer containing from 6 to 12 carbon atoms, like, for example, the elastomers obtained from ethylene and propylene with an unconjugated diene monomer of the above-mentioned type such as especially 1,4-hexadiene, ethylidenenorbornene and dicyclopentadiene, 4) the copolymers obtained by copolymerization of isobutene and of isoprene (butyl rubber), as well as the halogenated, in particular chlorinated or brominated, versions of these copolymers.

Conjugated dienes which are particularly suitable are 1,3-butadiene, 2-methyl-1,3-butadiene, 2,3-di($C_1$—$C_5$-alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 2-chloro-1,3-butadiene, 1,3-pentadiene, 2,4-hexadiene, and the like.

Aromatic vinyl compounds which are suitable are especially styrene, ortho-, meta- and para-methylstyrene, the commercial vinyltoluene mixture, para-tert-butylstyrene, methoxystyrenes, chlorostyrenes, vinylmesitylene, divinylbenzene, vinylnaphthalene, and the like.

The copolymers may contain between 99% and 20% by weight of diene units and from 1% to 80% by weight of vinylaromatic units. The elastomers may have any microstructure that is a function of the polymerization conditions employed, especially of the presence or absence of a modifying and/or randomizing agent and of the quantities of modifying and/or randomizing agent which are employed. The elastomers may be of block, random, sequential, microsequential or other structure and may be prepared in dispersion or in solution.

Those preferably suitable are the polybutadienes and in particular those which have a 1,2-unit content of between 4% and 80% and those which have more than 90% of cis 1,4 bonds, polyisoprenes, butadiene-styrene copolymers and in particular those which have a styrene content of between 5% and 50% by weight and more particularly between 20% and 40% by weight, a 1,2 bond content of the butadiene portion of between 4% and 65%, a trans 1,4 bond content of between 30% and 80%, those which have an overall content of aromatic compound of between 5% and 50% and a glass transition temperature (Tg) of between 0° C. and −80° C., and particularly those which have a styrene content of between 25% and 30% by weight, a content of vinyl bonds in the butadiene portion of between 55% and 65%, a trans 1,4 bond content of between 20% and 25% and a glass transition temperature of between −20° C. and −30° C.

In the case of butadiene-styrene-isoprene copolymers, those which are suitable have a styrene content of between 5 and 50% and more particularly between 10% and 40%, an isoprene content of between 15% and 60% by weight and more particularly between 20% and 50% by weight, a butadiene content of between 5 and 50% and more particularly between 20% and 40% by weight, a content of 1,2-units in the butadiene portion of between 4t and 85t, a content of trans 1,4 units in the butadiene portion of between 6% and 80%, a content of 1,2 plus 3,4-units in the isoprene portion of between 5% and 70% and a content of trans 1,4 units in the isoprene portion of between 10% and 50%.

The elastomer may, of course, be coupled and/or starred or else functionalized with a coupling and/or starring or functionalizing agent. The elastomer may also be natural rubber or a blend based on natural rubber with any synthetic, especially diene-based, elastomer.

Besides one or more elastomers and the silica, the compositions in accordance with the invention contain all or part of the other constituents and additives usually employed in rubber mixes, like plasticizers, pigments, antioxidants, antiozonant waxes, a crosslinking system based either on sulfur, sulfur donors and/or on peroxide and/or on bismaleimides, vulcanization accelerators, extender oils, one or more silica-coating agents such as alkoxysilanes, polyols, amines, and the like.

The compositions in accordance with the invention may contain between 0.5 and 15 parts by weight of functionalized polyorganosiloxane compound(s) and from 0.2 to 8 parts by weight of functionalized organosilane compound(s).

In a way which could not be foreseen by a person skilled in the art, it has been discovered that the rubber compositions in accordance with the invention and including a reinforcing additive consisting of at least one linear or cyclic functionalized polyorganosiloxane and at least one organosilane compound exerting a rubber/silica bond, make it possible:

to employ high ratios of organosilane agents belonging to the mercaptosilane class, without incurring a penalty in terms of "scorch safety" and without perturbing the processing of the compositions, to increase appreciably the effectiveness of the organosilane agents and particularly those of the mercaptosilane type, to prepare silica-filled vulcanizates exhibiting an improved hysteresis, which makes these compositions particularly useful for the manufacture not only of tires but also of semifinished products, especially of treads, of underlinings, of sidewall rubbers or of rubbers intended to adhere to textile or metal reinforcements, to obtain good processing properties in the raw state by virtue of a reduction in viscosity, to facilitate the adjustment of the content of rubber/silica reinforcement agent (in particular in the case of low contents), through the use of two products instead of one, without necessarily being penalized in terms of processing and scorch safety, in general, to prepare silica-filled vulcanizates exhibiting an advantageous compromise of properties when compared with the solutions already known in the art.

The maximum beneficial effect is obtained when the highly dispersible silica forms all of the reinforcing filler. A beneficial effect is also obtained when the silica is employed predominantly or blended with conventional precipitated silicas, or else with carbon black: carbon blacks which are suitable are any carbon blacks, especially all the commercially available blacks and preferably the HAF, ISAF, SAF and other blacks conventionally employed in tires and particularly in tire treads. As nonlimiting examples of such blacks may be mentioned the blacks N 134, N 115, N 234, N 339, N 347, N 375, and the like.

The quantity of carbon black which is present may vary within wide limits, it being understood, however, that the improvement in the properties will be proportionally greater the higher the silica content present. The quantity of carbon black which is present is preferably equal to or lower than 200% of the quantity of silica present in the composition.

Another subject-matter of the invention is a process for improving the hysteretic properties of rubber compositions including silica as reinforcing filler which are intended for the manufacture of tire casings and of semifinished products for tire casings, which consists in adding to the compositions a reinforcing additive consisting of the addition and the mixing, in any order, of at least one functionalized polyorganosiloxane compound containing, per molecule, at least one functional siloxy unit capable of bonding chemically and/or physically with the surface hydroxyl sites of the silica particles and at least one functionalized organosilane compound containing, per molecule, at least one functional group capable of bonding chemically and/or physically with the polyorganosiloxane and/or the hydroxyl sites of the silica particles and at least one other functional group capable of bonding chemically and/or physically to the chains of polymer(s).

Another subject-matter of the invention is a process making it possible to delay substantially the premature vulcanization (scorching) of diene rubber compositions intended for the manufacture of tire casings and of semifinished products for tire casings, including silica as reinforcing filler.

The process according to the invention consists in adding and incorporating into the rubber of the composition a reinforcing additive for establishing an elastomer/silica bond, consisting of a functionalized polyorganosiloxane compound containing, per molecule, at least one functional siloxy unit capable of bonding chemically and/or physically with the surface hydroxyl sites of the silica particles and at least one functionalized organosilane compound containing, per molecule, at least one functional group capable of bonding chemically and/or physically with the polyorganosiloxane and/or the hydroxyl sites of the silica particles and at least one other functional group capable of bonding chemically and/or physically to the chains of polymer(s).

The two constituents of the reinforcing additive may be added in any order, that is to say simultaneously or one after the other; the functionalized polyorganosiloxane compound is preferably added first before the addition of the organosilane compound. It is also possible to react the polyorganosiloxane with the silica before the latter is mixed with the rubber. This process enables the mercaptosilanes to be used on industrial scale by delaying the appearance of the phenomenon of scorching of the composition containing silica as reinforcing filler. This effect of delaying the appearance of the scorching phenomenon offers an advantage in the case of the mercaptosilanes, as well as in the case of other organosilane compounds, in the sense that it makes it possible to decrease the quantity of organosilane, which is generally very costly, needed without significantly affecting the compromise of the composition in terms of scorch safety, of ease of processing and of reinforcing power. The process according to the invention is thus capable of reducing the costs of manufacture.

The functionalized polyorganosiloxane compound acts as a covering agent, in contrast to a reinforcing function, when it is mixed with the silica in the presence of at least one elastomer forming part of the rubber composition used to manufacture the tire casing. In other words, the siliceous filler is covered with the organopolysiloxane compound(s).

The invention is illustrated, without any limitation being implied, by the examples which must not be taken to constitute a limitation of the scope of the invention. In the examples the properties of the compositions are evaluated as follows:

Mooney viscosity ML (1+4) at 100° C. measured according to standard AFNOR-NF-T43-005 (November 1980), entitled Mooney in the tables which follow.

Moduli of elongation at 300% (M 300), 100% (M 100): measurements performed in MPa according to standard AFNOR-NF-T46-002 (September 1988).

Tensile strength (TS) in MPa and elongation at break (EB) in %: measurements performed at 20° C. according to standard AFNOR-NF-T40-101 (September 1979)

Hysteretic losses (HL): measured by rebound at 60° C. on 6th impact and expressed in %.

Dynamic shear properties:
Measurements as a function of the deformation: performed at 10 Hertz with a crest-crest deformation ranging from 0.15% to 50%. The hysteresis is expressed by the measurement of tan δ at 7% deformation. The dynamic modulus (G) for the highest deformation level is expressed in $N/m^2$. The measurements are performed according to ASTM standard D 2231-87;

Scorch time: (T5) expressed in minutes.
Time needed to obtain an increase in the value of the consistometry index, expressed in "Mooney units", by 5 units above the minimum value measured in the case of this index. Measurements performed at 130° C. according to standard AFNOR-NF-T43-005 (November 1980).

Rheometric characteristics:
The following values are deduced from the vulcanization curves:
Ts (0.2): time in minutes needed for the increase in the torque by 0.2 N m from the minimum Mooney ML (1+4)100 torque.
Tc (99): vulcanization time in minutes corresponding to 99% of the highest torque obtained.

The measurements are performed at 150° C. according to standard AFNOR-NF-T43-015 (August 1975).

DESCRIPTION OF THE DRAWINGS

FIGS. 1 to 4 show the vulcanization curves for various rubber compositions including various reinforcing additives. The vulcanization period of the compositions, expressed in minutes, is shown as the abscissa. The rheometric torque, expressed in decanewtons per meter (dN/m) is shown as the ordinate.

DESCRIPTION OF PREFERRED EMBODIMENTS

In the examples the contents of materials are expressed in phe: parts per hundred of elastomer by weight

EXAMPLE 1

This example is intended to compare two rubber compositions which are identical with the exception of the covering additive which, in the case of test 1, the control test, is Dynasylan 3201 and, in the case of test 2, in accordance with the invention, consists of Dynasylan 3201 and the functionalized polyorganosiloxane (PMHS) corresponding to the formula (V-2) shown above. This functionalized PMHS is prepared as follows:

Into a 500 ml three-necked round bottom flask equipped with mechanical stirring, a thermometer and a dropping funnel are charged, under nitrogen atmosphere, 300 ml of ethanol predried on 3 angstrom molecular sieve and 10 $\mu$l of Karstedt catalyst (10% in hexane). The mixture is stirred and dropwise addition of polymethylhydrosiloxane (40 g, $dp_n$= 50) is started. The rate of addition of the Si—H fluid is adjusted to control the flow rate of hydrogen and the exothermicity of the reaction. At the end of addition the mixture is left stirring for one hour. 36 g of 1-octene are then added dropwise. After addition the reaction mixture is heated to 60° C. until all the Si—H functional groups have been consumed. The excess of alcohol and of octene is then evaporated off. 87 g of clear and slightly colored oil are recovered. NMR analysis shows the following structure (NMR)

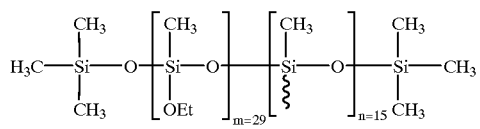

The diene polymers are processed by thermomechanical working in two stages in an internal mixer, which last 5 and 4 minutes respectively, with a mean blade speed of 45 rev/min, until a maximum drop temperature of 160° C. is reached, followed by a finishing stage performed at 30° C. on an external mixer, under the following formulations:

TABLE 1

|  | Composition No. | |
| --- | --- | --- |
|  | 1 | 2 |
| SBR (1) | 96 | 96 |
| PB (2) | 30 | 30 |
| Silica (3) | 80 | 80 |
| ZnO | 2.5 | 2.5 |
| Stearic acid | 2 | 2 |
| Antioxidant (4) | 1.9 | 1.9 |
| PMHS (5) |  | 4.5 |
| Dynasylan 3201 (6) | 2.8 | 2 |
| Aromatic oil | 6 | 6 |
| Sulfur | 1.1 | 1.1 |

TABLE 1-continued

|  | Composition No. | |
| --- | --- | --- |
|  | 1 | 2 |
| CBS (7) | 2 | 2 |
| DPG (8) | 1.5 | 1.5 |

(1) SBR which has 59.5% of 1,2 bonds, 23% of trans bonds, 26% of styrene incorporated and extended with 37.5% of oil;
(2) PB which has 4.3% of 1,2 bonds, 2.7% of trans bonds, 93% of cis 1,4 bonds
(3) Zeosil 1165 MP silica from the company Rhône-Poulenc
(4) N-1,3-Dimethylbutyl-N-phenyl-para-phenylenediamine
(5) Functionalized PMHS corresponding to the formula (V-2)
(6) γ-Mercaptopropyltriethoxysilane marketed by the company Huls
(7) N-Cyclohexyl-2-benzothiazylsulfenamide
(8) Diphenylguanidine The properties of the rubber compositions measured before curing (Mooney) and the rheograms at 150° C. are shown respectively in Table 2 and in FIG. 1.

TABLE 2

|  | Composition No. | |
| --- | --- | --- |
| Properties before curing | 1 | 2 |
| Mooney | 137 | 90 |
| T5 (min) | 3.5 | 22.5 |

In FIG. 1, curve C1 corresponds to the reference composition 1 with the mercaptosilane alone and curve C2 corresponds to the composition 2 in accordance with the invention. The scorch time results and the rheograms of FIG. 1 show that the invention allows the scorch safety to be considerably increased. In addition, the invention facilitates processing of the rubber compositions containing a mercaptosilane.

EXAMPLE 2

This example is also intended to show the need for, and the advantage of, employing a bonding agent simultaneously with a functionalized PMHS. Two compositions are produced which are identical with those of Example 1 with the exception of the contents of PMHS and Dynasylan 3201.

TABLE 3

|  | Composition No. | |
| --- | --- | --- |
|  | 3 | 4 |
| SBR | 96 | 96 |
| PB | 30 | 30 |
| Silica | 80 | 80 |
| ZnO | 2.5 | 2.5 |
| Stearic acid | 2 | 2 |
| Antioxidant | 1.9 | 1.9 |
| Aromatic oil | 6 | 6 |
| PMHS | 5 | 5 |
| Dynasylan 3201 |  | 1.5 |
| Sulfur | 1.1 | 1.1 |
| CBS | 2 | 2 |
| DPG | 1.5 | 1.5 |

The properties of the rubber compositions measured before and after curing are listed in Table 4.

TABLE 4

|  | Composition No. | |
| --- | --- | --- |
|  | 3 | 4 |
| Properties before curing | | |
| Mooney | 75 | 88 |
| T5 (min) | >30 | >30 |
| Cure time at 150° C. in minutes | 60 | 40 |
| Properties after curing | | |
| M100 | 0.68 | 1.5 |
| M300 | 2.47 | 6.75 |
| HL | 41.7 | 24.6 |
| EB | 1040 | 580 |
| TS | 16.8 | 19.6 |
| Dynamic properties | | |
| tan δ | 0.324 | 0.257 |

The results show that composition 3, containing no mercaptosilane, has a low level of reinforcement. On the other hand, the results obtained with composition 4 make it possible to demonstrate that the use of the invention gives a higher and a satisfactory level of reinforcement and lower hysteresis levels without significantly penalizing the properties before curing and consequently the processing.

EXAMPLE 3

The aim of this example is to demonstrate the advantage of the invention when compared with the use, known in the art, of a combination including a bonding agent of mercaptosilane type and an alkylsilane.

Two compositions are produced which are identical with those of Example 1 with the exception of the contents of covering additive and of sulfur and, in the case of control composition 5, the addition of an alkylsilane.

TABLE 5

|  | Composition No. | |
| --- | --- | --- |
|  | 5 | 6 |
| SBR | 96 | 96 |
| PB | 30 | 30 |
| Silica | 80 | 80 |
| ZnO | 2.5 | 2.5 |
| Stearic acid | 2 | 2 |
| Antioxidant | 1.9 | 1.9 |
| Aromatic oil | 6 | 6 |
| PMHS (9) |  | 4 |
| Dynasylan 3201 | 1.1 | 1.1 |
| Si 216 (*) | 4 |  |
| Sulfur | 2.4 | 2.4 |
| CBS | 2 | 2 |
| DPG | 1.5 | 1.5 |

(9) Functionalized PMHS corresponding to the formula (V-3)
(*) Si 216: covering agent of raw formula $C_{16}H_{33}Si(OEt)_3$ marketed by the company Degussa The results are listed in Table 6.

TABLE 6

|  | Composition No. | |
| --- | --- | --- |
|  | 5 | 6 |
| Properties before curing | | |
| Mooney | 80 | 78 |
| T5 (min) | 15 | 23 |
| Cure time at 150° C. in minutes | 40 | 40 |
| Properties after curing | | |
| M100 | 1.69 | 2.04 |
| M300 | 5.89 | 7.52 |
| HL | 30.3 | 30.9 |
| EB | 540 | 480 |
| TS | 21.4 | 21.1 |
| Dynamic properties | | |
| tan δ | 0.244 | 0.254 |

Composition 6, in accordance with the invention, enables scorch times T5 to be obtained which are superior to those obtained with the composition in accordance with the state of the art, employing the combination of a mercaptosilane and of an alkylsilane, while facilitating the processing.

In addition, composition 6, in accordance with the invention, makes it possible to obtain, at equivalent contents of constituent materials, a reinforcement level which is far superior to that of the control composition.

EXAMPLE 4

This example is intended to demonstrate that the invention makes it possible to introduce into the rubber compositions large quantities of organosilanes which have a mercapto functional group. The compositions thus prepared remain easy to process and exhibit a satisfactory scorch safety.

Three compositions in accordance with the invention are prepared, which are identical with those of Example 1 with the exception of the quantities of mercaptosilane, which vary.

TABLE 7

|  | Composition No. | | |
| --- | --- | --- | --- |
|  | 7 | 8 | 9 |
| SBR | 96 | 96 | 96 |
| PB | 30 | 30 | 30 |
| Silica | 80 | 80 | 80 |
| ZnO | 2.5 | 2.5 | 2.5 |
| Stearic acid | 2 | 2 | 2 |
| Antioxidant | 1.9 | 1.9 | 1.9 |
| Aromatic oil | 6 | 6 | 6 |
| PMHS | 4.5 | 4.5 | 4.5 |
| Dynasylan 3201 | 1 | 1.5 | 2 |
| Sulfur | 1.1 | 1.1 | 1.1 |
| CBS | 2 | 2 | 2 |
| DPG | 1.5 | 1.5 | 1.5 |

The properties of the rubber compositions measured before and after curing are listed in Table 8.

TABLE 8

|  | Composition No. | | |
| --- | --- | --- | --- |
|  | 7 | 8 | 9 |
| Properties before curing | | | |
| Mooney | 87 | 88 | 91 |
| T5 (min) | >30 | >30 | >30 |
| Cure time at 150° C. in minutes | 40 | 40 | 40 |
| Properties after curing | | | |
| M100 | 1.51 | 1.49 | 1.54 |
| M300 | 6.34 | 6.75 | 7.32 |
| HL | 25.9 | 24.6 | 23.2 |
| EB | 620 | 590 | 510 |
| TS | 19.8 | 19.3 | 17.7 |
| Dynamic properties | | | |
| G | $1.58 \times 10^6$ | $1.58 \times 10^6$ | $1.52 \times 10^6$ |
| tan δ | 0.263 | 0.255 | 0.24 |

The results show that the invention allows the mercaptosilane content to be increased without incurring any penalty in terms of scorch safety, which remains satisfactory, and of processing of the compositions.

Consequently, the invention makes it possible to prepare rubber compositions with high contents of bonding agent of the mercaptosilane class, in contrast to what was possible according to the prior state of the art.

EXAMPLE 5

This example is intended to demonstrate the advantage of the invention in relation to the use of Si 69 (bisr(3-triethoxysilylpropyl) tetrasulfide) marketed by the company Degussa, which is considered to be the product giving the best compromise in the case of compositions including silica as reinforcing filler, in terms of scorch safety, ease of processing and reinforcing power.

Two compositions are prepared which are identical with those of Example 1 with the exception, in the case of control composition 10, of the use of Si 69 alone as reinforcing additive and, in the case of composition 11, in accordance with the invention, of the Dynasylan 3201 content.

TABLE 9

|  | Composition No. | |
| --- | --- | --- |
|  | 10 | 11 |
| SBR | 96 | 96 |
| PB | 30 | 30 |
| Silica | 80 | 80 |
| ZnO | 2.5 | 2.5 |
| Stearic acid | 2 | 2 |
| Antioxidant | 1.9 | 1.9 |
| Aromatic oil | 6 | 6 |
| PMHS |  | 4.5 |
| Dynasylan 3201 |  | 1.5 |
| Si 69 | 6.4 |  |
| Sulfur | 1.1 | 1.1 |
| CBS | 2 | 2 |
| DPG | 1.5 | 1.5 |

The properties of the rubber components measured before and after curing are listed in Table 10.

TABLE 10

|  | Composition No. | |
| --- | --- | --- |
|  | 10 | 11 |
| Properties before curing | | |
| Mooney | 82 | 88 |
| T5 (min) | 25 | >30 |
| Cure time at 150° C. in minutes | 40 | 40 |
| Properties after curing | | |
| M100 | 1.56 | 1.49 |
| M300 | 6.97 | 6.75 |
| HL | 26.4 | 24.6 |
| EB | 560 | 590 |
| TS | 19.5 | 19.3 |
| Dynamic properties | | |
| tan δ | 0.299 | 0.255 |

It is found that the invention makes it possible to improve the scorch safety and to decrease the hysteresis without substantially penalizing the other properties.

EXAMPLE 6

This example is intended to demonstrate that the beneficial effect of the invention is also obtained with rubber compositions based on natural rubber which are reinforced with silica. Three compositions are prepared according to the formulations shown in Table 11.

TABLE 11

|  | Composition No. | | |
| --- | --- | --- | --- |
|  | 12 | 13 | 14 |
| Natural rubber | 100 | 100 | 100 |
| Silica (3) | 50 | 50 | 50 |
| ZnO | 5 | 5 | 5 |
| Stearic acid | 2 | 2 | 2 |
| Antioxidant (4) | 1.9 | 1.9 | 1.9 |
| PMHS (5) |  | 2.5 |  |
| PMHS (9) |  |  | 2.5 |
| A 189 (10) | 3 | 1.5 | 1.5 |
| Sulfur | 1.3 | 1.3 | 1.3 |
| CBS (7) | 2 | 2 | 2 |
| DPG (8) | 1.1 | 1.1 | 1.1 |

The materials (3) (4) (5) (7) and (8) are identical with those in Example 1.
Material (9) is identical with that of Example 3.
(10): γ-Mercaptopropyltrimethoxysilane marketed by the company OSI.

Composition 12 is a control composition containing only one mercaptosilane compound, the rheogram of which is shown in FIG. 2 by curve C3; compositions 13 and 14 are in accordance with the invention and their rheograms are shown in FIG. 2 by curves C4 and C5 respectively. The properties of the rubber compositions measured before curing and after curing and the rheograms at 150° C. are shown in Table 12 and in FIG. 2 respectively.

TABLE 12

|  | Composition. No. | | |
| --- | --- | --- | --- |
|  | 12 | 13 | 14 |
| Properties before curing | | | |
| Mooney | 102 | 54 | 53 |
| T5 (min) | 0 | 12.5 | 12 |

TABLE 12-continued

| | Composition. No. | | |
|---|---|---|---|
| | 12 | 13 | 14 |
| Rheometric characteristics | | | |
| Ts (0.2) min | 0 | 4.5 | 4.5 |
| Tc (99) (min) | 5 | 11 | 11 |
| Cure time at 150° C. in minutes | | 20 | 20 |
| Properties after curing | Premature vulcanization | | |
| M100 | | 1.77 | 1.79 |
| M300 | | 5.7 | 5.85 |
| HL | | 15.2 | 14.6 |

A considerable improvement in the scorch safety is observed throughout the measurements of the scorch time and of the rheometric characteristics. Furthermore, the invention makes it possible to improve the processing and to allow on industrial scale the production of compositions with a bonding agent of the mercaptosilane class.

EXAMPLE 7

Two compositions are produced which are identical with those of Example 5, except that in the case of composition 16, in accordance with the invention, the quantity of PMHS (5) is higher than in composition 11.

TABLE 13

| | Composition No. | |
|---|---|---|
| | 15 | 16 |
| SBR | 96 | 96 |
| PB | 30 | 30 |
| Silica | 80 | 80 |
| ZnO | 2.5 | 2.5 |
| Stearic acid | 2 | 2 |
| Antioxidant | 1.9 | 1.9 |
| Aromatic oil | 6 | 6 |
| PMHS | | 6 |
| Dynasylan 3201 | | 1.5 |
| Si 69 | 6.4 | |
| Sulfur | 1.1 | 1.1 |
| CBS | 2 | 2 |
| DPG | 1.5 | 1.5 |

Composition 15 is a reference composition identical with composition 10 of Example 5, already known in the art, and capable of being used for producing a tire casing tread. The properties of the rubber compositions measured before and after curing are shown in Table 14.

TABLE 14

| | Composition No. | |
|---|---|---|
| | 15 | 16 |
| Properties before curing | | |
| Mooney | 82 | 86 |
| T5 (min) | 25 | >30 |
| Cure time at 150° C. in minutes | 40 | 40 |

TABLE 14-continued

| | Composition No. | |
|---|---|---|
| | 15 | 16 |
| Properties after curing | | |
| M100 | 1.56 | 1.59 |
| M300 | 6.97 | 7.5 |
| Hysteresis | 26.4 | 22.3 |
| EB | 560 | 530 |
| TS | 19.5 | 18.1 |
| Dynamic properties | | |
| G | $3.67 \times 10^6$ | $1.97 \times 10^6$ |
| tan δ | 0.299 | 0.231 |

The results show that the composition in accordance with the invention makes it possible to obtain properties before curing which are similar to those obtained with Si 69 and that, after curing, it has a reinforcement level identical with that of reference composition 15, while the hysteresis and tan δ levels are considerably lower, and this makes such a composition particularly suitable for forming part of the constitution of semifinished products, especially treads, capable of giving tire casings which have a reduced rolling resistance.

EXAMPLE 8

This example shows the advantage of a rubber composition in accordance with the invention and crosslinking with sulfur, for coating and adhering to a metal reinforcement intended to be employed in a tire casing.

Three compositions are produced according to the formulations described in Table 15. Composition 17 is a reference composition containing no elastomer/silica reinforcement additive. Composition 18 is also a control composition containing only γ-mercaptopropyltriethoxysilane. Composition 19 is in accordance with the invention.

TABLE 15

| | Composition No. | | |
|---|---|---|---|
| | 17 | 18 | 19 |
| Natural rubber | 100 | 100 | 100 |
| Silica (12) | 50 | 50 | 50 |
| ZnO | 4 | 4 | 4 |
| Stearic acid | 1 | 1 | 1 |
| Antioxidant (4) | 2 | 2 | 2 |
| Cobalt salt (13) | 0.7 | 0.7 | 0.7 |
| PMHS (11) | | | 2.5 |
| Dynasylan 3201 (6) | | 1 | 1 |
| Sulfur | 4.5 | 4.5 | 4.5 |
| CBS (7) | 0.8 | 0.8 | 0.8 |
| DPG (8) | 0.8 | 0.8 | 0.8 |

Materials (4), (6), (7) and (8) are the same as those in Example 1
(11) Functionalized PMHS corresponding to the formula (V-4)
(12) Ultrasil VN 2 silica marketed by the company Degussa
(13) Cobalt naphthenate The properties of the rubber compositions measured before and after curing at 150° C. are shown, respectively, in Table 16.

TABLE 16

| | Composition No. | | |
|---|---|---|---|
| | 17 | 18 | 19 |
| Properties before curing | | | |
| Mooney | 94 | 82 | 74 |
| Cure time at 150° C. in minutes | 35 | 35 | 35 |
| Properties after curing | | | |
| M100 | 1.69 | 2.22 | 2.06 |
| M300 | 4.08 | 6.36 | 5.91 |
| HL | 20.7 | 17.2 | 14.5 |
| EB | 590 | 570 | 510 |
| TS | 22.1 | 23.6 | 22.1 |

It is found that the composition in accordance with the invention has processing properties in the unvulcanized state which are superior to those of the compositions according to the prior art. In other words, the use of the reinforcing additive according to the invention allows the Mooney viscosity to be improved.

It is also found that the composition in accordance with the invention has a hysteresis which is clearly improved without incurring a penalty in the reinforcing properties and the mechanical properties of the composition.

EXAMPLE 9

The aim of this example is to show that a reinforcing additive including polyorganosiloxanes which are functionalized "at the chain end" can also be employed within the scope of the invention. Three compositions are produced according to the formulations described in Table 17.

The compositions 15 and 20 are control compositions in accordance with the state of the art, employing only a bonding agent. Their rheograms are shown in FIG. 3 by curves C6 and C7 respectively. Composition 21 is in accordance with the invention and the rheogram is shown in FIG. 3 by curve C8.

TABLE 17

| | Composition No. | | |
|---|---|---|---|
| | 15 | 20 | 21 |
| SBR (1) | 96 | 96 | 96 |
| PB (2) | 30 | 30 | 30 |
| Silica (3) | 80 | 80 | 80 |
| ZnO | 2.5 | 2.5 | 2.5 |
| Stearic acid | 2 | 2 | 2 |
| Antioxidant (4) | 1.9 | 1.9 | 1.9 |
| Aromatic oil | 6 | 6 | 6 |
| PS 340 (14) | | | 4.5 |
| Dynasylan 3201 (6) | | 1.8 | 1.8 |
| Si 69 | 6.4 | | |
| Sulfur | 1.1 | 1.1 | 1.1 |
| CBS (7) | 2 | 2 | 2 |
| DPG (8) | 1.5 | 1.5 | 1.5 |

Materials (1), (2), (3), (4), (6), (7), (8) and Si 69 are the same as those in Example 1.
(14) PS340 polydimethylsiloxane functionalized with OH at chain ends, marketed by ABCR.

The properties of the rubber compositions measured before and after curing at 150° C., and the rheograms produced at 150° C. are shown in Table 18 and in FIG. 3 respectively.

TABLE 18

| | Composition No. | | |
|---|---|---|---|
| | 15 | 20 | 21 |
| Properties before curing | | | |
| Mooney | 82 | 105 | 90 |
| Rheometric characteristics | | | |
| Ts (0.2) | 5 | 0 | 8 |
| Tc (99) | 34 | 27 | 30 |
| Cure time at 150° C. in minutes | 40 | 40 | 40 |
| Properties after curing | | | |
| M100 | 1.56 | 1.68 | 2.44 |
| M300 | 6.97 | 4.38 | 10.92 |
| HL | 26.4 | 35 | 19.8 |

Throughout the Mooney viscosity results we see that the invention makes it possible to facilitate the processing of the rubber compositions comprising a high content of reinforcing agent of the mercaptosilane type.

It is also seen that the composition in accordance with the invention makes it possible to obtain rigidities (M100 and M300) which are clearly superior to those of the reference compositions and that the hysteretic properties are clearly improved in relation to those measured in the case of the control compositions 15 and 20.

Furthermore, the rheometric characteristics, and the curves in FIG. 3, show that the invention makes it possible to employ a mercaptosilane, because it gives rise to a large increase in the scorch safety of the composition.

EXAMPLE 10

The aim of this example is to demonstrate that the rubber compositions in accordance with the invention which are reinforced at the same time with silica and with carbon black have an improved processing.

2 compositions are produced according to the formulations described in Table 19. Composition 22 is a control composition, while composition 23 is in accordance with the invention.

TABLE 19

| | Composition No. | |
|---|---|---|
| | 22 | 23 |
| SBR (15) | 137.5 | 137.5 |
| Silica (3) | 40 | 40 |
| Black N 234 | 15 | 15 |
| ZnO | 3 | 3 |
| Stearic acid | 2 | 2 |
| Antioxidant (4) | 1.5 | 1.5 |
| PMHS (11) | | 2.5 |
| Dynasylan 3201 (6) | 1 | 1 |
| Sulfur | 1.4 | 1.4 |
| CBS (7) | 1.4 | 1.4 |

Materials (3), (4), (6) and (7) are the same as those in Example 1.
Material (11) is that employed in Example 8.
(15) Emulsion SBR (Cariflex 1712) which has 16% of 1,2 bonds, 72% of trans bonds and 23.5% of incorporated styrene, extended with 37.5% of oil and marketed by Shell.

The properties of the rubber compositions measured in the raw state are shown in Table 20.

TABLE 20

|  | Composition No. | |
|---|---|---|
| Properties before curing | 22 | 23 |
| Mooney | 114 | 97 |
| T5 (min) | >30 | >30 |

It is found that the composition in accordance with the invention still has a Mooney viscosity which is lower than that of the control composition when the reinforcing filler in the composition is a blend of carbon black and of silica.

EXAMPLE 11

This example is intended to demonstrate that the compositions in accordance with the invention have improved properties with a reduced Si 69 content when it is employed in combination with a functionalized polyorganosiloxane.

Two compositions are produced according to the formulations described in Table 21. Composition 24 is a control composition in accordance with the state of the art. Composition 25 is in accordance with the invention.

TABLE 21

|  | Composition No. | |
|---|---|---|
|  | 24 | 25 |
| SBR (1) | 96 | 96 |
| PB (2) | 30 | 30 |
| Silica (3) | 80 | 80 |
| ZnO | 2.5 | 2.5 |
| Stearic acid | 2 | 2 |
| Antioxidant (4) | 1.9 | 1.9 |
| Aromatic oil | 6 | 6 |
| PMHS (11) |  | 4.5 |
| Si 69 | 2 | 2 |
| Sulfur | 1.1 | 1.1 |
| CBS (7) | 2 | 2 |
| DPG (8) | 1.5 | 1.5 |

Materials (1), (2), (3), (4), (7) and (8) are the same as those employed in Example 1 and material (11) is that employed in Example 8.

The properties of the rubber compositions measured before curing and the rheometric characteristics obtained at 150° C. are shown in Table 22.

FIG. 4 contains the rheograms of compositions 24 and 25, shown by curve C9 and curve C10 respectively.

TABLE 22

|  | Composition No. | |
|---|---|---|
|  | 24 | 25 |
| Properties before curing |  |  |
| Mooney | 113 | 65 |
| T5 (min) | 6 | >30 |
| Rheometric characteristics (150° C.) |  |  |
| Ts (0.2) (min) | 0 | 15 |
| Tc (99) (min) | indeterminate | 35 |

The results show that the invention makes it possible to obtain rubber compositions which are highly filled with silica and which have an excellent processability, but with a reduced Si 69 content, and this makes it possible to achieve savings in the production costs of compositions containing silica as a reinforcing filler without incurring any penalty in the compromise in terms of scorch safety.

EXAMPLE 12

This example is intended to demonstrate that the compositions in accordance with the invention have properties which are equivalent to those obtained when Si 69 is employed, but with an overall reinforcing additive content which is clearly decreased.

Two compositions are produced according to the formulations described in Table 23. Composition 15, already described in Example 7, is in accordance with the state of the art; composition 27 is in accordance with the invention.

TABLE 23

|  | Composition No. | |
|---|---|---|
|  | 15 | 27 |
| SBR (1) | 96 | 96 |
| PB (2) | 30 | 30 |
| Silica (3) | 80 | 80 |
| ZnO | 2.5 | 2.5 |
| Stearic acid | 2 | 2 |
| Antioxidant (4) | 1.9 | 1.9 |
| Aromatic oil | 6 | 6 |
| PS 340 (14) |  | 2.5 |
| Dynasylan 3201 (6) |  | 1.1 |
| Si 69 | 6.4 |  |
| Sulfur | 1.1 | 1.1 |
| CBS (7) | 2 | 2 |
| DPG (8) | 1.5 | 1.5 |

Materials (1), (2), (3), (4), (6), (7), (8) and (14) are the same as those in the preceding examples.

The properties of the rubber composition measured before and after curing at 150*C are shown in Table 24.

TABLE 24

|  | Composition No. | |
|---|---|---|
|  | 15 | 27 |
| Properties before curing |  |  |
| Mooney | 82 | 90 |
| T5 (min) | 25 | >30 |
| Cure time at 150° C. in minutes | 40 | 40 |
| Properties after curing |  |  |
| M100 | 1.56 | 1.62 |
| M300 | 6.97 | 6.75 |
| HL | 26.4 | 26.2 |
| EB | 560 | 600 |
| TS | 19.5 | 21.8 |

The results show that the composition in accordance with the invention makes it possible to obtain properties before curing which are close to those obtained with Si 69 and that after curing it has a reinforcement level identical with that of the control composition No. 15, but with an overall reinforcing additive content which is clearly lower (3.6 phe against 6.4 phe), which makes it possible to achieve savings in the costs of the composition, without incurring a penalty in the compromise of the properties.

We claim:

1. A tire tread having improved hysteretic properties comprising a rubber composition, wherein the rubber composition comprises a mixture of: (A) a diene elastomer; (B) silica as a reinforcing filler; and (C) a reinforcing additive comprising a mixture and/or the product of in situ reaction of (i) at least one functionalized polyorganosiloxane compound containing, per molecule, at least one functional siloxy unit capable of bonding chemically and/or physically with the surface hydroxyl sites of the silica particles and (ii) at least one functionalized organosilane compound containing, per molecule, at least one functional group capable of bonding chemically and/or physically with the polyorganosiloxane and/or the hydroxyl sites of the silica particles and at least one other functional group capable of bonding chemically and/or physically to the chains of the diene elastomer.

2. The tire tread of claim 1, wherein the functionalized polyorganosiloxane compound is chosen from compounds comprising, per molecule, a functional unit selected from the group consisting of α—at least one functional siloxy unit of the following formula (I):

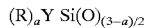  (I)

in which:
a=0, 1 or 2;
R is a monovalent hydrocarbon radical chosen from linear or branched alkyls containing from 1 to 6 carbon atoms, or from aryls, the radicals R being identical or different when a=2; and
Y is a $C_1$–$C_{15}$ linear or branched alkoxy radical;

β—at least one functional siloxy unit of the following formula (II):

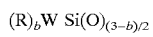  (II)

in which:
b=0, 1 or 2;
R corresponds to the same definition as that given above for the substituent R of formula (I) and may be identical with or different from the latter; and
W is a monovalent hydrocarbon radical containing from 2 to 30 carbon atoms and constituting a functional residue bonded to silicon by an Si—C bond, this residue being chosen from the following groups:
  (i) a linear or branched alkyl group containing at least 7 carbon atoms;
  (ii) a linear or branched $C_2$–$C_{20}$ alkenyl group containing one or more double bonds in and/or at the end(s) of the chain(s); or
  (iii) a saturated or unsaturated aliphatic mono- or polycyclic group containing 5 to 20 carbon atoms and one or more ethylenic double bond(s) in the ring(s); and γ—at least one siloxy unit of the following formula (III):

  (III)

in which:
c=0, 1, 2 or 3, d=1 and c+d≦3; and
the substituent R being as defined above in formulae (I) and (II).

3. The tire tread of claim 2, wherein
(A) in formula (I): R is selected from the group consisting of methyl, ethyl, propyl, butyl, and phenyl; and Y is selected from the group consisting of $C_1$–$C_6$ alkoxys, methoxy, ethoxy and (iso)propoxy; and
(B) in formula (II): W has one or more atoms selected from the group consisting of oxygen and sulfur; the $C_2$–$C_{20}$ akenyl group includes one or more double bonds which are conjugated and/or associated with at least one activating group in the a position; and the aliphatic mono- or polycyclic group is bonded to silicon through the intermediacy of a $C_2$–$C_{10}$ linear or branched alkylene radical.

4. The tire tread of claim 3, wherein substituent W of formula (II) is chosen from the following radicals:
a radical (i) containing from 10 to 30 carbon atoms;
a $C_6$–$C_{10}$ radical (ii), containing one or more double bonds which may be conjugated or unconjugated with each other;
a saturated or unsaturated aliphatic monocyclic or polycyclic group (iii) containing 5 to 20 carbon atoms which may be linked to silicon through the intermediacy of a $C_2$–$C_6$ linear or branched alkylene radical.

5. The tire tread of claim 4, wherein the substituent W of the formula (II) is selected from the group consisting of dodecyl, undecyl, tridecyl, hexynyl dodecenyl, cyclohexyl, cyclohexenyl, bicyclic rings originating from norbornene, and bicyclic rings originating from dicylcopentadiene.

6. The tire tread of claim 1, wherein the functionalized polyorganosiloxane compound is chosen from the compounds of formula (IV):

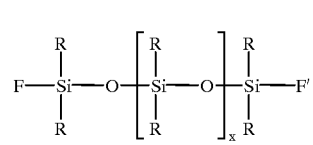  (IV)

in which:
R is a monovalent hydrocarbon radical chosen from linear or branched alkyls containing from 1 to 6 carbon atoms, or from aryls or a linear or branched $C_2$–$C_{20}$ alkenyl group containing one or more double bonds; the various exemplars of R may be identical with or different from each other;
x=0 to 500; and
F and F' are monovalent radicals chosen from hydrogen, the halogens, those corresponding to the definition of R, hydroxyl, alkoxy, enoxy, acyloxy, acetoxy, oxime or amine functional groups; F and F' may be different or identical, but in the latter case it must not be the radical R.

7. The tire tread of claim 6, wherein in formula (IV): x=0 to 50; and F and F' are individually selected from the group consisting of chlorine, hydroxyl, methoxy, and ethoxy.

8. The tire tread of claim 1, wherein the polyorganosiloxane is formed by a linear, random, sequential or block copolymer, of the following formula (V):

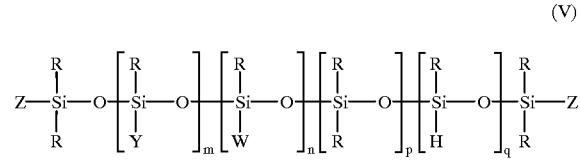  (V)

in which:
the symbols Y, W and R are as defined in claim 10;
the symbol Z is a monovalent radical chosen from the radicals formed by hydrogen and from those corresponding to the definitions of R, Y and W;
the sum m+n+p+q≧3;
0≦m≦100;
0≦n≦100;
0≦p≦20; and
0≦q≦40;

with the conditions according to which:
if m=0, at least one of the substituents Z corresponds to a radical corresponding to the definition characterizing Y; and
if m=n=0 and p+q≧1, then at least one of the substituents Z corresponds to a radical corresponding to the definition characterizing Y.

9. The tire tread of claim 8, wherein one or more of the following definitions apply in formula (V):
(A) 3<m+n+p+1<100;
(B) p=q=0, m≦1, n≦50;
(C) 1≦m≦50;
(D) 1≦n≦50;
(E) 0≦p≦10; and
(F) 0≦q≦10.

10. The tire tread of claim 9, wherein p=q=0 and 0.5≦m/n≦5 in formula (V).

11. The tire tread of claim 10, wherein 1≦m/n≦3 in formula (V).

12. The tire tread of claim 1, wherein the polyorganosiloxane consists of a cyclic copolymer of the following formula (VI):

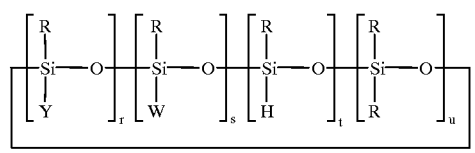
(VI)

in which:
Y, W and R are as defined in claim 10, and with r, s, t and u representing positive whole or decimal numbers;
the sum r+s+t+u≧3;
1≦r≦8;
1≦s≦8;
0≦t≦8; and
0≦u≦8.

13. The tire tread of claim 12, wherein one or more of the following definitions apply in formula (VI):
(A) 3≦r+s+t+u≦8;
(B) t=u=0;
(C) 1≦r≦4;
(C) 1≦s≦4;
(D) 0≦t≦4; and
(E) 0≦u≦4.

14. The tire tread of claim 1, wherein the functionalized organosilane is chosen from the compounds corresponding to the following formulae (X), (XI), (XII) and (XIII):

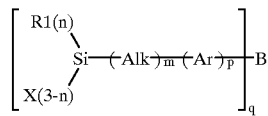
(X)

in which:
R1 denotes an alkyl group containing 1 to 10 carbon atoms, or a phenyl radical;
X denotes a hydrolyzable group chosen from:
the halogens,
alkoxy or cycloalkoxy radicals, and
acyloxy radicals,
wherein after hydrolysis, X may denote a hydroxyl group (OH);

0≦n≦2;

(Alk) denotes a divalent hydrocarbon group chosen from linear or branched alkyls containing from 1 to 10 carbon atoms;

m is 0 or 1;

(Ar) denotes a hydrocarbon group chosen from aryls, containing from 6 to 12 carbon atoms;

p is 0 or 1, with the condition that p and m are not both equal to 0;

q=1 or 2; and

B denotes a group capable of forming a bond with at least one of the elastomers of the rubber composition, wherein:
if q=2: B is a polysulfide functional group chosen from the following groups:
—Sx— with 1≦x≦8, x being a positive integer,

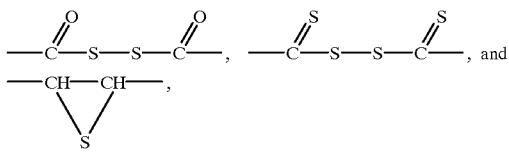, and if q=1: B is a functional group chosen from the following groups:

—SH, 

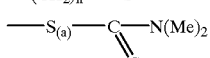 with 1≦ n, n′ ≦ 6 and n can be equal to n′,

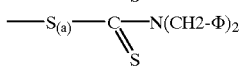 with 1≦ a≦ 8,

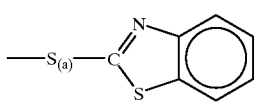 with 1≦ a≦ 8, with 1≦ a≦ 8, with Z being a halogen residue or a nitrogen function,

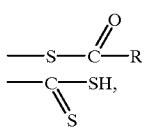 wherein R is a cyclic or acyclic alkyl or alkenyl, or an aryl,

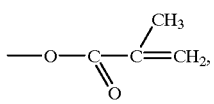

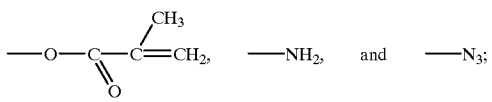

-continued

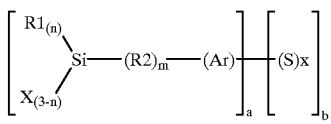
(XI)

in which:
R1 and X correspond to the same definition as that given above as legend to formula (X);
$0 \leq n \leq 2$;
(R2) denotes a divalent hydrocarbon group chosen from linear or branched alkyls and alkylenoxys, containing from 1 to 10 carbon atoms;
m is 0 or 1;
(Ar) denotes a hydrocarbon group chosen from aryls, containing from 6 to 12 carbon atoms;
(S)x is a divalent polysulfured radical, each free valency being bonded directly to a carbon atom of an aromatic ring, it being possible for a number of aromatic rings to be linked together by the radical (S)x;
$2 \leq x \leq 6$; and
$a \geq 2$ and $b \geq 1$ with $0.4 \leq a/b \leq 2$;

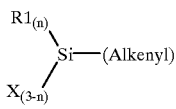
(XII)

in which:
R1 and X correspond to the same definition as that given above as legend to formula (X);
$0 \leq n \leq 2$; and
Alkenyl denotes a $C_2$ to $C_{20}$ linear or branched hydrocarbon group, cyclic or otherwise, containing one or more double bonds; and

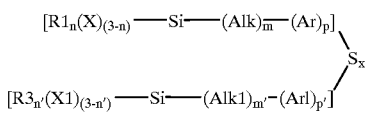
(XIII)

in which:
each pair of symbols R1 and R3, X and X1, Alk and Alk1, n and n', m and m', Ar and Ar1, and p and p' have equivalent definitions, wherein each can be identical or different from the other in a pair, and correspond to the same definition as that given above as legend to formula (X) for R1, X, Alk, n, m, Ar, and p;

the symbol x is a positive integer from 1 to 8; and
with the condition of not simultaneously having n=n', m=m', p=p', X=X, R1=R3, Alk=Alk1 and Ar=Ar1.

15. The tire tread of claim 14, wherein:
(A) in formula (X): X is selected from the group consisting of chlorine and bromine; (Alk) is a divalent hydrocarbon group chosen from linear or branched alkyls containing from 1 to 6 carbon atoms; (Ar) denotes a hydrocarbon group chosen from aryls, containing from 6 to 8 carbon atoms; and when B is—S—Z, Z is selected from the group consisting of chloride, bromide, amine and amide;
(B) in formula (XI): R2 is a divalent hydrocarbon group chosen from $C_1$ to $C_6$ linear or branched alkyls and $C_1$ to $C_6$ linear or branched alkylenoxys; and
(C) in formula (XII): Alkenyl denotes a $C_2$ to $C_6$ linear or branched hydrocarbon, cyclic or otherwise, containing one or more double bonds.

16. The tire tread of claim 14, wherein the organosilane compound is a mercaptosilane.

17. The tire tread of claim 16, wherein the organosilane compound is 3-mercaptopropyltri($C_1$–$C_6$-alkoxy)silane or 3-mercaptopropyltrimethoxy- or -triethoxysilane.

18. The tire tread of claim 14, wherein the organosilane compound is a bis(tri-$C_1$–$C_4$-alkoxysilylpropyl) tetrasulfide.

19. The tire tread of claim 18, wherein the organosilane compound is a bis(triethoxysilylpropyl) tetrasulfide.

20. The tire tread of claim 1, wherein the silica is a highly dispersible precipitated silica exhibiting a BET surface $\leq 450$ m$^2$/g and a CTAB specific surface $\leq 450$ m$^2$/g.

21. The tire tread of claim 20, wherein the silica has a BET specific surface/CTAB specific surface ratio $\geq 1$ and $\leq 1.2$.

22. The tire tread of claim 1, wherein it additionally comprises carbon black.

23. The tire tread of claim 22, wherein the quantity of carbon black is $\leq 200\%$ relative to the quantity of silica present.

24. The tire tread of claim 1, wherein the diene-based polymer is a butadiene-styrene copolymer or a butadiene-styrene-isoprene copolymer or a polybutadiene or polyisoprene or natural rubber or a blend of two or more of these diene-based polymers.

25. The tire tread of claim 24, wherein the butadiene-styrene copolymer is a copolymer prepared in solution which has a styrene content of between 25 and 30% by weight, a content of vinyl bonds in the butadiene-based portion of between 55% and 65%, a trans 1,4 bond content of between 20% and 25% and a glass transition temperature of between −20° C. and −80° C.

26. The tire tread of claim 25, wherein the polybutadiene has more than 90% of cis 1,4 bonds.

* * * * *

UNITED STATES PATENT AND TRADEMARK OFFICE
CERTIFICATE OF CORRECTION

PATENT NO. : 6,362,253 B1
DATED : March 26, 2002
INVENTOR(S) : Olivier Durel

It is certified that error appears in the above-identified patent and that said Letters Patent is hereby corrected as shown below:

Title page,
Item [73], Assignee: "Generale" should read -- Générale -- and "Establissements" should read -- Etablissements --

Column 12,
Line 46, "CH2" should read -- $CH_2$ --

Column 13,
Line 63, "Sx" should read -- $S_x$ --

Column 14,
Line 27, "[$C_2H_5O)_3$" should read -- [$(C_2H_5O)_3$ --

Column 15,
Line 32, "a-olefin" should read -- α-olefin --

Column 16,
Line 21, "4t and 85t" should read -- 4% and 85% --

Column 23,
Line 34, "(bisr(3-" should read -- (bis(3- --

Column 30,
Line 32, "150* C" should read -- 150° C --

Column 31,
Line 62, "akenyl" should read -- alkenyl --
Line 64, "a" should read -- α --

UNITED STATES PATENT AND TRADEMARK OFFICE
CERTIFICATE OF CORRECTION

PATENT NO. : 6,362,253 B1
DATED : March 26, 2002
INVENTOR(S) : Olivier Durel

It is certified that error appears in the above-identified patent and that said Letters Patent is hereby corrected as shown below:

Column 32,
Line 15, "dicylcopentadiene" should read -- dicyclopentadiene --

Column 34,
Line 46, "CH2" should read -- $CH_2$ --

Column 36,
Line 3, "X=X" should read -- X=X1 --

Signed and Sealed this

Sixth Day of May, 2003

JAMES E. ROGAN
*Director of the United States Patent and Trademark Office*